United States Patent
Blazer et al.

(10) Patent No.: US 12,210,201 B2
(45) Date of Patent: **\*Jan. 28, 2025**

(54) OPTICAL FIBER CABLE WITH REINFORCEMENT

(71) Applicant: Corning Optical Communications LLC, Charlotte, NC (US)

(72) Inventors: Bradley Jerome Blazer, Granite Falls, NC (US); Michael John Gimblet, Conover, NC (US); Julian Latelle Greenwood, III, Greensboro, NC (US); Jason Clay Lail, Wilmington, NC (US); Warren Welborn McAlpine, Hickory, NC (US); Eric John Mozdy, Huntersville, NC (US)

(73) Assignee: Corning Optical Communications LLC, Charlotte, NC (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/386,811

(22) Filed: Nov. 3, 2023

(65) Prior Publication Data

US 2024/0061199 A1 Feb. 22, 2024

Related U.S. Application Data

(63) Continuation of application No. 17/826,430, filed on May 27, 2022, now Pat. No. 11,822,139, which is a
(Continued)

(51) Int. Cl.
*G02B 6/44* (2006.01)
(52) U.S. Cl.
CPC .......... *G02B 6/443* (2013.01); *G02B 6/4403* (2013.01); *G02B 6/441* (2013.01); *G02B 6/4431* (2023.05);
(Continued)

(58) Field of Classification Search
CPC .... G02B 6/443; G02B 6/4431; G02B 6/4403; G02B 6/441; G02B 6/4432; G02B 6/4434; G02B 6/4435
See application file for complete search history.

(56) References Cited

U.S. PATENT DOCUMENTS 3,293,351 A 12/1966 Giaro
3,847,721 A 11/1974 Evans
(Continued)

FOREIGN PATENT DOCUMENTS

CN 1030494 A 1/1989
CN 1383014 A 12/2002
(Continued)

OTHER PUBLICATIONS

English Translation of CN2014800624785 Office Action Dated May 17, 2018; 2 Pages; Chinese Patent Office.
(Continued)

*Primary Examiner* — Peter Radkowski
(74) *Attorney, Agent, or Firm* — Thomas R. Irwin

(57) ABSTRACT

An optical communication cable includes a cable jacket formed from a first material, a plurality of core elements located within the cable jacket, and an armor layer surrounding the plurality of core elements within the cable jacket, wherein the armor layer is a multi-piece layer having a first armor segment extending a portion of the distance around the plurality of core elements and a second armor segment extending a portion of the distance around the plurality of core elements, wherein a first lateral edge of the first armor segment is adjacent a first lateral edge of the second armor segment and a second lateral edge of the first armor segment is adjacent a second lateral edge of the second armor
(Continued)

segment such that the combination of the first armor segment and the second armor segment completely surround the plurality of core elements.

20 Claims, 15 Drawing Sheets

Related U.S. Application Data continuation of application No. 15/903,184, filed on Feb. 23, 2018, now Pat. No. 11,353,669, which is a continuation of application No. 15/426,537, filed on Feb. 7, 2017, now Pat. No. 9,927,588, which is a continuation of application No. 14/317,899, filed on Jun. 27, 2014, now Pat. No. 9,594,226.

(60) Provisional application No. 61/892,534, filed on Oct. 18, 2013.

(52) U.S. Cl.
CPC ......... *G02B 6/4432* (2013.01); *G02B 6/4434* (2013.01); *G02B 6/4435* (2013.01)

(56) References Cited

U.S. PATENT DOCUMENTS

| | | | |
|---|---|---|---|
| 3,899,807 A | 8/1975 | Sovish et al. |
| 4,078,853 A | 3/1978 | Kempf et al. |
| 4,237,174 A | 12/1980 | Lagardere et al. |
| 4,340,771 A | 7/1982 | Watts |
| 4,384,906 A | 5/1983 | Molinari et al. |
| 4,496,214 A | 1/1985 | Oestreich et al. |
| 4,515,435 A | 5/1985 | Anderson |
| 4,535,098 A | 8/1985 | Evani et al. |
| 4,675,512 A | 6/1987 | Doucet et al. |
| 4,729,629 A | 3/1988 | Saito et al. |
| 4,730,894 A | 3/1988 | Arroyo |
| 4,767,184 A | 8/1988 | Ogasawara et al. |
| 4,795,509 A | 1/1989 | De Bruycker |
| 4,796,970 A | 1/1989 | Reeve et al. |
| 4,803,103 A | 2/1989 | Pithouse et al. |
| 4,902,097 A | 2/1990 | Worthington et al. |
| 4,930,860 A | 6/1990 | Tansey et al. |
| 4,941,729 A | 7/1990 | Hardin et al. |
| 4,946,237 A | 8/1990 | Arroyo et al. |
| 4,954,213 A | 9/1990 | Jos et al. |
| 4,973,611 A | 11/1990 | Puder |
| 4,978,536 A | 12/1990 | Takahashi |
| 4,993,804 A | 2/1991 | Mayr et al. |
| 5,001,304 A | 3/1991 | Hardin et al. |
| 5,155,789 A | 10/1992 | Le et al. |
| 5,157,752 A | 10/1992 | Greveling et al. |
| 5,173,961 A | 12/1992 | Chiasson |
| 5,179,611 A | 1/1993 | Umeda et al. |
| 5,233,678 A | 8/1993 | Katurashima et al. |
| 5,241,618 A | 8/1993 | Gould |
| 5,247,599 A | 9/1993 | Vyas et al. |
| 5,300,732 A | 4/1994 | Wambeke et al. |
| 5,388,175 A | 2/1995 | Clarke |
| 5,440,660 A | 8/1995 | Dombrowski et al. |
| 5,451,278 A | 9/1995 | Nolf |
| 5,509,097 A * | 4/1996 | Tondi-Resta ......... G02B 6/4403 385/112 |
| 5,633,075 A | 5/1997 | Park et al. |
| 5,671,312 A | 9/1997 | Jamet |
| 5,684,904 A | 11/1997 | Bringuier et al. |
| 5,703,983 A | 12/1997 | Beasley, Jr. |
| 5,742,008 A | 4/1998 | Dalrymple |
| 5,912,347 A | 6/1999 | Hudlicky et al. |
| 5,978,536 A | 11/1999 | Brandi et al. |
| 6,137,936 A | 10/2000 | Fitz et al. |
| 6,185,352 B1 | 2/2001 | Hurley |
| 6,193,824 B1 | 2/2001 | Einsle et al. |
| 6,215,931 B1 | 4/2001 | Risch et al. |
| 6,304,701 B1 | 10/2001 | Bringuier et al. |
| 6,318,061 B1 | 11/2001 | Schneider et al. |
| 6,334,015 B2 | 12/2001 | Jamet |
| 6,377,738 B1 | 4/2002 | Anderson et al. |
| 6,397,802 B1 | 6/2002 | Rutschmann et al. |
| 6,459,836 B1 | 10/2002 | Bocanegra et al. |
| 6,483,971 B2 | 11/2002 | Gaillard et al. |
| 6,487,346 B2 | 11/2002 | Nothofer |
| 6,500,365 B1 | 12/2002 | Cecchi et al. |
| 6,546,712 B2 | 4/2003 | Moss et al. |
| 6,597,844 B1 | 7/2003 | Witt et al. |
| 6,603,908 B2 | 8/2003 | Dallas et al. |
| 6,658,184 B2 | 12/2003 | Bourget et al. |
| 6,721,480 B1 | 4/2004 | Bocanegra et al. |
| 6,744,954 B1 | 6/2004 | Tanaka et al. |
| 6,760,523 B2 | 7/2004 | V. Nechitailo |
| 6,798,958 B2 | 9/2004 | Bourget et al. |
| 6,811,148 B2 * | 11/2004 | Frankel ............... B01F 23/2311 261/DIG. 70 |
| 6,856,748 B1 | 2/2005 | Elkins et al. |
| 6,870,995 B2 | 3/2005 | Johnson et al. |
| 6,901,191 B2 | 5/2005 | Hurley et al. |
| 6,912,347 B2 | 6/2005 | Rossi et al. |
| 6,931,190 B2 | 8/2005 | Ino et al. |
| 6,937,802 B2 | 8/2005 | Jamet et al. |
| 6,957,000 B2 | 10/2005 | McAlpine et al. |
| 6,973,246 B2 | 12/2005 | Bocanegra et al. |
| 7,050,685 B2 * | 5/2006 | Plemmons ........... G02B 6/4431 385/100 |
| 7,082,241 B2 | 7/2006 | Jamet et al. |
| 7,123,801 B2 | 10/2006 | Fitz |
| 7,200,307 B2 | 4/2007 | Bau et al. |
| 7,212,715 B2 | 5/2007 | Dallas et al. |
| 7,225,533 B2 | 6/2007 | Sylvia et al. |
| 7,242,830 B2 | 7/2007 | Storaasli et al. |
| 7,242,831 B2 | 7/2007 | Fee |
| 7,254,302 B2 * | 8/2007 | Parsons ................ G02B 6/4433 385/100 |
| 7,321,709 B2 | 1/2008 | Yokokawa et al. |
| 7,359,600 B2 | 4/2008 | Kim et al. |
| 7,373,057 B2 | 5/2008 | Pizzorno et al. |
| 7,391,943 B2 | 6/2008 | Blazer et al. |
| 7,431,963 B2 | 10/2008 | Konstadinidis et al. |
| 7,567,741 B2 | 7/2009 | Abernathy et al. |
| 7,570,852 B2 | 8/2009 | Nothofer et al. |
| 7,570,854 B2 | 8/2009 | Keller et al. |
| 7,630,605 B2 | 12/2009 | Bringuier et al. |
| 7,742,667 B2 | 6/2010 | Paschal et al. |
| 7,750,060 B2 | 7/2010 | Zahora et al. |
| 7,970,247 B2 | 6/2011 | Barker |
| 7,974,507 B2 | 7/2011 | Lovie et al. |
| 7,995,886 B2 | 8/2011 | Pizzorno et al. |
| 8,031,997 B2 | 10/2011 | Overton |
| 8,041,167 B2 | 10/2011 | Overton |
| 8,118,282 B2 | 2/2012 | Griffioen et al. |
| 8,165,439 B2 | 4/2012 | Overton |
| 8,175,434 B2 | 5/2012 | Davidson et al. |
| 8,180,190 B2 | 5/2012 | Bringuier et al. |
| 8,189,974 B2 | 5/2012 | Hashimoto et al. |
| 8,355,613 B2 | 1/2013 | Weimann |
| 8,415,564 B2 | 4/2013 | Seraj et al. |
| 8,467,645 B2 | 6/2013 | Keller et al. |
| 8,467,650 B2 | 6/2013 | Overton et al. |
| 8,494,327 B2 | 7/2013 | Keller et al. |
| 8,498,509 B2 | 7/2013 | Tatat |
| 8,618,418 B2 | 12/2013 | Amato |
| 8,649,644 B2 | 2/2014 | Greenwood et al. |
| 8,682,124 B2 | 3/2014 | Logan |
| 8,923,676 B2 * | 12/2014 | Blazer .................. B29C 48/156 385/100 |
| 9,140,874 B2 | 9/2015 | Blazer et al. |
| 9,201,208 B2 | 12/2015 | Gimblet et al. |
| 2001/0021296 A1 | 9/2001 | Nothofer |
| 2002/0126970 A1 | 9/2002 | Anderson et al. |
| 2002/0141713 A1 | 10/2002 | Okada et al. |
| 2002/0159727 A1 | 10/2002 | Okada et al. |
| 2003/0035635 A1 | 2/2003 | Chastain et al. |
| 2003/0049002 A1 | 3/2003 | Bosisio et al. |

(56) References Cited

U.S. PATENT DOCUMENTS

| | | |
|---|---|---|
| 2003/0113080 A1 | 6/2003 | Oxford et al. |
| 2003/0123822 A1 | 7/2003 | Witt et al. |
| 2003/0165310 A1 | 9/2003 | Moon et al. |
| 2003/0192817 A1* | 10/2003 | Frankel ............ B01F 23/23124 |
| | | 210/220 |
| 2004/0062497 A1* | 4/2004 | Plemmons .......... G02B 6/4431 |
| | | 385/109 |
| 2004/0096167 A1 | 5/2004 | Rossi et al. |
| 2004/0151448 A1 | 8/2004 | Adams et al. |
| 2004/0208462 A1* | 10/2004 | Parsons ............. G02B 6/44384 |
| | | 385/100 |
| 2004/0240806 A1 | 12/2004 | Lail et al. |
| 2004/0252954 A1 | 12/2004 | Ginocchio et al. |
| 2005/0094953 A1 | 5/2005 | Park et al. |
| 2006/0045443 A1 | 3/2006 | Blazer |
| 2006/0093268 A1 | 5/2006 | Zimmel |
| 2006/0137894 A1 | 6/2006 | Cusson et al. |
| 2006/0242824 A1 | 11/2006 | Varkey et al. |
| 2006/0263557 A1 | 11/2006 | Watson |
| 2006/0280413 A1 | 12/2006 | Paschal et al. |
| 2008/0031578 A1 | 2/2008 | Varkey et al. |
| 2008/0273845 A1 | 11/2008 | Weimann |
| 2009/0116797 A1 | 5/2009 | Stingl et al. |
| 2009/0214167 A1 | 8/2009 | Lookadoo et al. |
| 2009/0297104 A1 | 12/2009 | Kachmar |
| 2009/0304338 A1 | 12/2009 | Davidson et al. |
| 2009/0317039 A1* | 12/2009 | Blazer .................... G02B 6/443 |
| | | 385/107 |
| 2010/0067856 A1 | 3/2010 | Knoch et al. |
| 2010/0074583 A1 | 3/2010 | Varkey et al. |
| 2010/0092139 A1 | 4/2010 | Overton |
| 2010/0119202 A1 | 5/2010 | Overton |
| 2010/0150505 A1 | 6/2010 | Testu et al. |
| 2010/0189399 A1 | 7/2010 | Sillard et al. |
| 2010/0202741 A1 | 8/2010 | Ryan et al. |
| 2010/0206417 A1* | 8/2010 | Wolf .................... F16L 55/1683 |
| | | 138/97 |
| 2010/0276179 A1 | 11/2010 | Amato |
| 2011/0091171 A1 | 4/2011 | Tatat et al. |
| 2011/0100671 A1 | 5/2011 | Seraj et al. |
| 2011/0110635 A1 | 5/2011 | Toge et al. |
| 2011/0135816 A1 | 6/2011 | Burns et al. |
| 2011/0194825 A1 | 8/2011 | Parris |
| 2011/0225814 A1 | 9/2011 | Amato |
| 2011/0268398 A1 | 11/2011 | Quinn et al. |
| 2011/0286705 A1 | 11/2011 | Blazer et al. |
| 2011/0286706 A1 | 11/2011 | Greenwood et al. |
| 2012/0051702 A1* | 3/2012 | Blazer .................. G02B 6/4488 |
| | | 385/113 |
| 2012/0063731 A1 | 3/2012 | Fitz et al. |
| 2012/0099825 A1 | 4/2012 | Messer |
| 2012/0257864 A1 | 10/2012 | Consonni et al. |
| 2012/0281953 A1 | 11/2012 | Choi et al. |
| 2013/0051743 A1 | 2/2013 | Gimblet et al. |
| 2013/0058614 A1 | 3/2013 | Gimblet et al. |
| 2013/0094821 A1 | 4/2013 | Logan |
| 2013/0108226 A1 | 5/2013 | Gimblet et al. |
| 2015/0104570 A1 | 4/2015 | Blazer et al. |

FOREIGN PATENT DOCUMENTS

| | | |
|---|---|---|
| CN | 200986607 | 12/2007 |
| CN | 102023357 | 4/2011 |
| CN | 202583543 | 12/2012 |
| CN | 105556367 | 5/2016 |
| DE | 3935986 | 5/1991 |
| EP | 1255144 | 11/2002 |
| EP | 1531352 | 5/2005 |
| EP | 1610163 | 12/2005 |
| EP | 1982222 | 10/2008 |
| EP | 2520962 | 11/2012 |
| FR | 2502831 | 10/1982 |
| GB | 2064163 | 6/1981 |
| GB | 2096343 | 10/1982 |
| JP | 03-137607 | 6/1991 |
| JP | 05-100135 | 4/1993 |
| JP | 05-314825 | 11/1993 |
| JP | 09-180527 | 7/1997 |
| JP | 09-185027 | 7/1997 |
| JP | 2002-328277 | 11/2002 |
| JP | 2007-011020 | 1/2007 |
| JP | 2010-039018 | 2/2010 |
| KR | 10-0288444 | 5/2001 |
| KR | 10-2001-0045604 A | 6/2001 |
| KR | 10-1140219 B1 | 5/2012 |
| WO | 01/21706 A1 | 3/2001 |
| WO | 02/99491 A1 | 12/2002 |
| WO | 2006/034722 A1 | 4/2006 |
| WO | 2007/073386 A1 | 6/2007 |
| WO | 2007/091880 A1 | 8/2007 |
| WO | 2011/137236 A1 | 11/2011 |
| WO | 2012/071490 A2 | 5/2012 |
| WO | 2013/130121 A1 | 9/2013 |
| WO | 2013/172878 A1 | 11/2013 |

OTHER PUBLICATIONS

European Communication pursuant to Article 94(3) EPC for European Application No. 14789738.3, mailed on Aug. 4, 2020, 5 pages.

European Patent Application No. 14789738.3 Office Action dated Jan. 4, 2019; 5 Pages; European Patent Office.

Hogari et al., Feb. 1998, "Optical Fiber Cables for Residential and Business Premises," Journal of Lightwave Technology, vol. 16, No. 2, pp. 207-213.

Indian Patent Application No. 201617013138; First Examination Report Mailed Mar. 3, 2020; India Patent Office; 8 PGS.

International Preliminary Report On Patentability of the International Searching Authority; PCT/US2014/060581; Mailed Apr. 28, 2016; 9 Pages; European Patent Office.

International Search Report and Written Opinion of the International Searching Authority; PCT/US14/060581; Mailed Jan. 9, 2015; 12 Pages; European Patent Office.

International Search Report and Written Opinion of the International Searching Authority; PCT/US2014/060581; dated Jan. 9, 2015; 13 Pages.

JP2016524407 Office Action Mailed May 28, 2018, Japan Patent Office, 4 Pgs.

Marelli et al., Nov. 11-14, 2007, "Indoor Cables for FTTH Applications, Allowing Quick and Simple Subscriber Connection," 56th IWCS Conference: Proceedings of the International Wire & Cable Symposium (IWCS), Inc., pp. 121-127.

Marik, J., "Advanced SZ Stranding Technology for Enhanced Applications," 4 pages, Last accessed on Feb. 21, 2014 from http://rosendahlaustria.com/custom/rosendahlaustria/Rosendahl.sub.-- Produ-cts.sub.--PDF/1062003111324.sub.--p1.sub.--.pdf.

Nextrom, "SZ Stranding Line OFC 70," 2 pages, Last accessed on Feb. 21, 2014 from http://www.nextrom.com/877.sub.--en.sub.--SZ-Stranding-Line.asp-x.

Non-Final Rejection Response for U.S. Appl. No. 13/790,329, Mailing Date Oct. 11, 2013—20 pages.

Non-Final Rejection Response for U.S. Appl. No. 13/790,329, dated Oct. 11, 2013—20 pages.

Patent Cooperation Treaty Annex to Form PCT/ISA/206, Communication Relating to the Results of the Partial International Search, Application No. PCT/US2013/061133, Jan. 8, 2014, 3 pages.

Patent Cooperation Treaty, International Search Report for PCT/US14/060581, Mail date Jan. 9, 2015, 13 pages.

Prysmian Cables & Systems, Oct. 5, 2005, "Glossary Excerpt from Prysmian's Wire and Cable Engineering Guide," Revision 3, pp. 1-40, Retrieved from www.prysmian.com.

Rechberger, M., Horschlager, W., "Buffering & SZ-Stranding Process for Compact Dry Tube FO-Cable," Proceedings of the 56.sup. Annual International Wire & Cable Symposium, 2007, -pp. 614-617, Last accessed on Feb. 24, 2014 from http://ecadigitallibrary.com/pdf/IWCS07/15.sub.-- 5.pdf.

U.S. Appl. filed Apr. 1, 2014, Michael Emmerich, 38 pages., U.S. Appl. No. 14/231,875.

(56) References Cited

OTHER PUBLICATIONS

U.S. Appl. filed Dec. 20, 2013, Anne G. Bringuier, 22 pages., U.S. Appl. No. 14/136,311.
U.S. Appl. filed Dec. 30, 2013, Anne G. Bringuier, 30 pages., U.S. Appl. No. 61/921,769.
U.S. Appl. filed Dec. 30, 2013, David Wesley Chiasson, 42 pages., U.S. Appl. No. 61/921,755.
U.S. Appl. filed Dec. 30, 2013, Warren W. McAlpine, 56 pages., U.S. Appl. No. 61/921,777.
U.S. Appl. filed Dec. 30, 2013, William Carl Hurley, 45 pages., U.S. Appl. No. 61/921,763.
U.S. Appl. filed Dec. 7, 2013, Mario Sergio Sandate Aguilar, 35 pages., U.S. Appl. No. 14/099,921.
U.S. Appl. filed Feb. 27, 2014, Warren W. McAlpine, 18pages., U.S. Appl. No. 14/192,007.
U.S. Appl. filed Mar. 8, 2013, Bradley J. Blazer, 48 pages., U.S. Appl. No. 13/790,329.
U.S. Appl. filed Oct. 18, 2013, Bradley J. Blazer, 42 pages., U.S. Appl. No. 61/892,534.
U.S. Application filed Dec. 30, 2013, Anne G. Bringuier, 30 pages, U.S. Appl. No. 61/921,769.
USPTO, Non-Final Rejection for U.S. Appl. No. 13/790,329, Mailing Date Aug. 16, 2013—12 pages.
USPTO, Notice of Allowance for U.S. Appl. No. 13/790,329, dated Nov. 12, 2013—8 pages.
USPTO, Notice of Allowance for U.S. Appl. No. 13/790,329, Mailing Date Nov. 12, 2013—8 pages.

\* cited by examiner

OPTICAL FIBER CABLE WITH REINFORCEMENT

RELATED APPLICATIONS

This application is a continuation of U.S. patent application Ser. No. 17/826,430, filed May 27, 2022, which is a continuation of U.S. patent application Ser. No. 15/903,184, filed Feb. 23, 2018, now U.S. Pat. No. 11,353,669, which is a continuation of U.S. patent application Ser. No. 15/426,537, filed Feb. 7, 2017, now U.S. Pat. No. 9,927,588, which is a continuation of U.S. patent application Ser. No. 14/317,899, filed Jun. 27, 2014, now U.S. Pat. No. 9,594,226, which claims the benefit of priority under 35 U.S.C. § 119 of U.S. Provisional Application No. 61/892,534, filed on Oct. 18, 2013, the content of which is relied upon and incorporated herein by reference in their entirety.

BACKGROUND

The disclosure relates generally to optical communication cables and more particularly to optical communication cables including a multi-piece reinforcement layer, such as a multi-piece reinforcement layer. Optical communication cables have seen increased use in a wide variety of electronics and telecommunications fields. Optical communication cables contain or surround one or more optical communication fibers. The cable provides structure and protection for the optical fibers within the cable.

SUMMARY

One embodiment of the disclosure relates to an optical communication cable. The optical communication cable includes a cable body and a plurality of elongate optical transmission elements located within the cable body. The optical communication cable includes a multi-piece reinforcement layer surrounding the plurality of optical transmission elements. The multi-piece reinforcement layer includes a first reinforcement sheet located within the cable body and extending a portion of the distance around the plurality of elongate optical transmission elements, and the first reinforcement sheet has a first lateral edge and an opposing second lateral edge. The multi-piece reinforcement layer includes a second reinforcement sheet located within the cable body and extending a portion of the distance around the plurality of elongate optical transmission elements, and the second reinforcement sheet has a first lateral edge and an opposing second lateral edge.

An additional embodiment of the disclosure relates to an optical communication cable. The optical communication cable includes an extruded cable body having an inner surface defining a passage in the cable body, and the cable body is formed from a first material. The optical communication cable includes a plurality of optical transmission elements located within the passage and a reinforcement layer wrapped around the plurality of optical transmission. The reinforcement layer surrounds the plurality of optical transmission elements within the passage. The reinforcement layer includes a first segment and a second segment. The first segment is wrapped a portion of the distance around the plurality of elongate optical transmission elements, and the first segment has a first lateral edge and an opposing second lateral edge. The second segment is wrapped a portion of the distance around the plurality of elongate optical transmission elements, and the second segment has a first lateral edge and an opposing second lateral edge. The optical communication cable includes a first elongate member formed from a second material embedded in the first material of the cable body. The first elongate member is aligned with and located exterior to the first lateral edge of the first segment. The optical communication cable includes a second elongate member formed from the second material embedded in the first material of the cable body. The second elongate member is aligned with and located exterior to the second lateral edge of the first segment. The first and second elongate member facilitate opening of the cable body to provide access to the plurality of optical transmission elements located within the passage. An outer surface of the first segment is bonded to the inner surface of the cable body such that the first segment remains bonded to the cable body upon opening of the cable body.

An additional embodiment of the disclosure relates to an optical communication cable. The optical communication cable includes a cable body including an inner surface defining a passage in the cable body. The optical communication cable includes an elongate central strength member located in the passage. The optical communication cable includes a plurality of elongate optical transmission elements wrapped around the elongate central strength member such that a portion of the length of the plurality of wrapped elongate optical transmission elements form a spiral portion around the elongate central strength member. The optical communication cable includes a reinforcement layer wrapped around the plurality of optical transmission such that the reinforcement layer surrounds the plurality of optical transmission elements. The reinforcement layer includes a first segment and a second segment. The first segment is wrapped a portion of the distance around the plurality of elongate optical transmission elements, and the first segment has a first lateral edge and an opposing second lateral edge. The second segment is wrapped a portion of the distance around the plurality of elongate optical transmission elements, and the second segment has a first lateral edge and an opposing second lateral edge. The reinforcement layer applies a radial inwardly directed force to the outer surfaces of the plurality of elongate optical transmission elements such that the reinforcement layer acts to maintain the spiral arrangement of the spiral portion of the wrapped elongate optical transmission elements.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
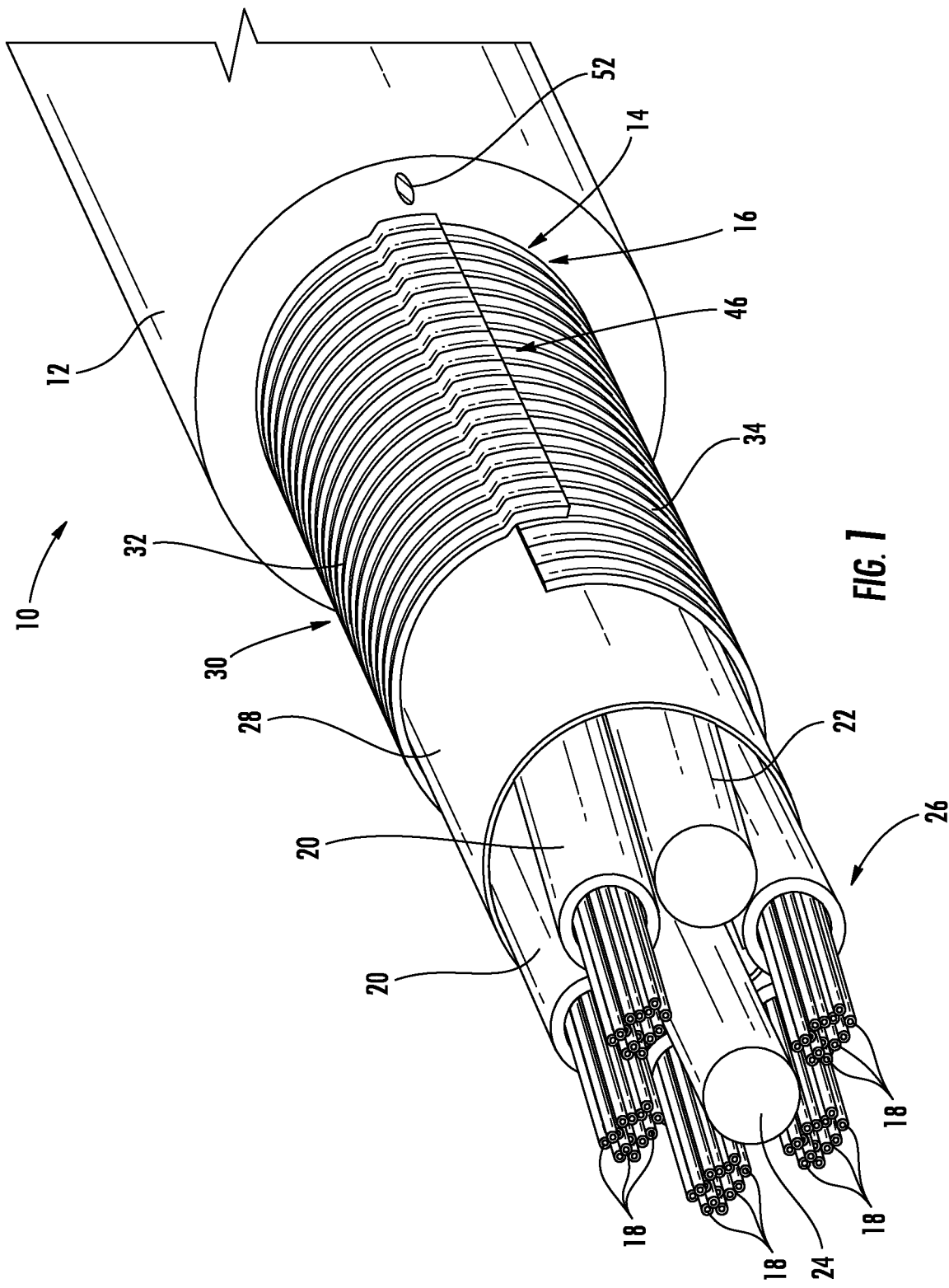
FIG. 1 is a perspective view of an optical fiber cable according to an exemplary embodiment.

Referring generally to the figures, various embodiments of an optical communication cable (e.g., a fiber optic cable, an optical fiber cable, etc.) are shown. In general, the cable embodiments disclosed herein include one or more optical transmission elements wrapped in a protective, reinforcement or armor material (e.g., a corrugated metal sheet of material). A cable body or jacket formed from a polymer material (e.g., a medium density polyethylene material) surrounds the armored group of optical fibers. Generally, the cable jacket provides physical support and protection to the optical fibers within the cable and the armor material provides additional reinforcement to the optical fibers within the cable body.

In various embodiments discussed herein, the reinforcement layer is formed from at least two separate pieces or sheets of material that are each wrapped a portion of the distance around the optical fibers. Because the reinforcement layer is formed from two pieces of material, the opposing lateral edges of each sheet of reinforcement material may be overlapped, coupled to or bonded together to form a reinforcement layer surrounding the optical fibers. In various embodiments, in addition to holding the two segments of the reinforcement layer together around the optical fibers, the coupling between the two segments of the reinforcement layer may also provide for additional circumferential and/or axial rigidity to the cable. In addition, in contrast to single-piece wrapped armor layers typical in fiber optic cables, the individual sections of the multi-piece reinforcement layer discussed herein do not form a complete loop, allowing both inner and outer tooling to be used to more precisely shape the segments of the reinforcement layer to fit snuggly around the optical transmission elements of the cable. In various embodiments, this precise shaping allows the armor segment to bind or restrain optical transmission elements in a wrapped pattern (e.g., the S-Z stranding pattern) around a central strength element.

In addition to the formation and strength functions discussed above, the multi-piece reinforcement layer discussed herein works in conjunction with easy access features to provide easy access to optical fibers within the cable, in various embodiments. In such embodiments, the cable jacket may include two or more easy access features (e.g., coextruded discontinuities within the material of the cable jacket) that provide for splitting of the jacket by the user. In various embodiments, the easy access features may be located adjacent to the lateral edges of the segments of the reinforcement layer and the reinforcement layers may be bonded to the cable jacket. In such embodiments, when the cable jacket is opened by splitting along the easy access features, the segments of reinforcement layer remain bonded to the cable jacket and the separate segments of the reinforcement layer are allowed to separate from each other. This arrangement allows for easy access to the optical fibers within the cable with a single opening action.

Figure 2:
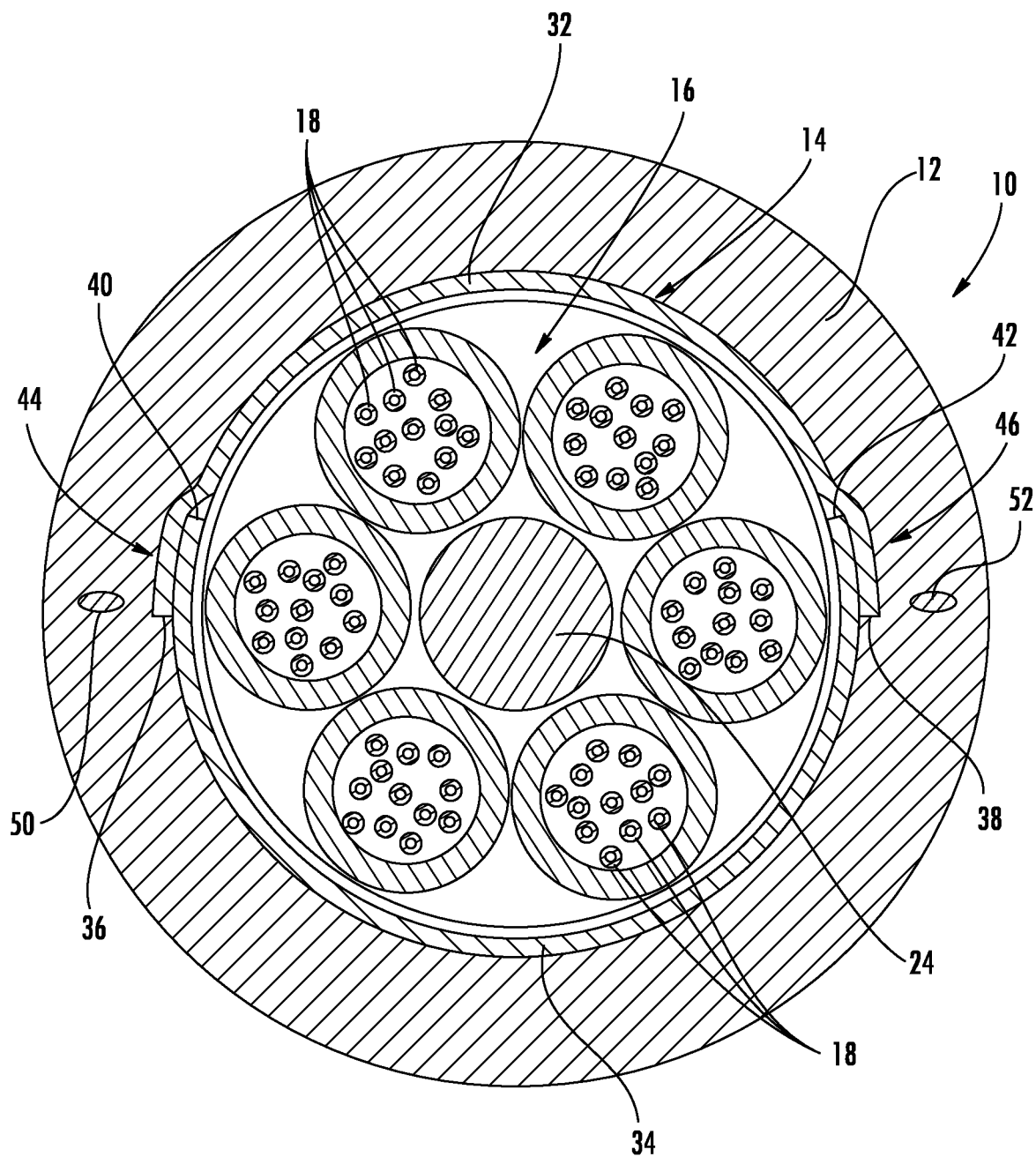
FIG. 2 is a cross-sectional view of the cable of FIG. 1 according to an exemplary embodiment.

Referring to FIGS. 1 and 2, an optical communication cable, shown as cable 10, is shown according to an exemplary embodiment. Cable 10 includes a cable body, shown as cable jacket 12, having an inner surface 14 that defines an inner passage or cavity, shown as central bore 16. As will be generally understood, inner surface 14 of jacket 12 defines an internal area or region within which the various cable components discussed below are located.

In the embodiment shown in FIG. 1, cable 10 includes a plurality of core elements located within central bore 16. A first type of core element is an optical transmission core element, and in this embodiment, the optical transmission core elements include optical fibers 18 that are located within tubes, such as buffer tubes 20. One or more additional core elements, shown as filler rods 22, may also be located within bore 16. Filler rods 22 and buffer tubes 20 are arranged around a central support, shown as central strength member 24, formed from a material such as glass-reinforced plastic or metal (e.g., steel). Together, buffer tubes 20 containing optical fibers 18, filler rods 22 and central strength member 24 form the core 26 of cable 10. Generally, cable 10 provides structure and protection to optical fibers 18 during and after installation (e.g., protection during handling, protection from elements, protection from vermin, etc.).

In various embodiments, cable 10 includes a film or membrane, shown as binding film 28, located around buffer tubes 20 and filler rods 22 of cable 10. Thin film 28 is an extruded thin film that cools to provide an inwardly directed force on to buffer tubes 20 and filler rods 22. The inwardly directed force provided by film 28 assists to hold buffer tubes 20 and filler rods 22 in a fixed position relative to central strength member 24 by increasing the normal force and therefore frictional force between these components. Thus, in some embodiments, an interference fit is provided between the outer surfaces of the core elements and film 28 such that film 28 acts to provide an inwardly directed force onto the core elements of cable 10. In addition, the inwardly directed force provided by film 28 acts to prevent/resist unraveling of the wound core elements. In some embodiments, a hot melt adhesive is applied to couple core elements such as buffer tubes 20 and filler rods 22 to strength member 24. Thus, in various embodiments, the film of cable 10 is a constraining element or constraining sleeve that acts to bind together the core of cable 10 as discussed herein. In specific embodiments, the film of cable 10 is an elastic sleeve that applies a radial inwardly directed force as discussed herein.

In various embodiments, film 28 is formed from a first material and jacket 12 is formed from a second material. In various embodiments, the first material is different from the second material. In some such embodiments, the material type of the first material is different from the material type of the second material. In various embodiments, film 28 may be formed from a variety of extruded polymer materials. In various embodiments, film 28 may be formed from low-density polyethylene (LDPE), polyester or polypropylene. In one embodiment, film 28 is formed from a linear LDPE. In one embodiment, film 28 is formed from an LDPE material having a modulus of elasticity between 600 MPa and 1000 MPa, and more specifically about 800 MPa (e.g., 800 MPa plus or minus 5 percent). In one embodiment, film 28 is formed from a polyester material having a modulus of elasticity between 2000 MPa and 2800 MPa, and more specifically about 2400 MPa (e.g., 2400 MPa plus or minus 5 percent). In various embodiments, the material of film 28 may include a coloring material. In one such embodiment, film 28 may be colored the same as jacket 12. In one such embodiment, the material of film 28 may be a polymer material (e.g., LDPE, PP) including carbon black coloring material, and the different material of jacket 12 may be a different polymer material (e.g., medium density polyethylene) that also includes carbon black coloring material. In addition, film 28 may include UV stabilizing compounds and may include weakened areas (e.g., lower thickness areas) that facilitate tearing and opening along with other components of cable 10 discussed herein.

As noted above, the material of film 28 is different from the material of jacket 12. In some such embodiments, film 28 is formed from a first material that is extruded at an earlier time or earlier stage in cable production than jacket 12. In such embodiments, film 28 is formed prior to formation of jacket 12. In some such embodiments, a first extrusion process forms film 28 at an earlier time in cable production, and a second extrusion process forms jacket 12 at a later time in cable production. In some such embodiments, the first material of film 28 and the second material of jacket 12 are the same type of material (e.g., both are MDPE, PP, etc.) that are associated with cable 10 at different time points during the production of cable 10. In other embodiments, the first material of film 28 and the second material of jacket 12 are the different types of material (e.g., film 28 is an LDPE and jacket 12 is MDPE) and are also associated with cable 10 at different time points during production of cable 10.

In various embodiments, a layer of powder, such as water absorbing powder or particles, such as super absorbent polymer (SAP), or a water swellable gel or liquid, is located within bore 16. In such embodiments, the inner surface of film 28 includes the water absorbent particles or other material that directly contacts the outer surfaces of buffer tubes 20 and filler rods 22 under the radial inwardly directed force applied by film 28. In other words, as discussed herein, contact between film 28 and buffer tubes 20 and filler rods 22 may include contact through certain discontinuous intermediate or filler materials that may be present within bore 16, such as SAP particles, SAP yarns and/or water swellable gels and liquids, that may be positioned within bore 16. However, as discussed herein, contact between film 28 and buffer tubes 20 and filler rods 22 does not include contact through a circumferentially continuous layer of material located between film 28 and buffer tubes 20. In some embodiments, the inner surface of film 28 directly contacts the outer surface of buffer tubes 20 such at least a portion of the inner surface of film 28 directly physically interacts with the outer surface of the buffer tube 20 without intervening material.

As shown, cable 10 includes a reinforcement sheet or layer, shown as armor layer 30, that is located outside of film 28 in the exemplary arrangement of FIG. 1. Armor layer 30 is wrapped around the interior elements (including optical fibers 18) of cable 10 such that armor layer 30 surrounds optical fibers 18. Armor layer 30 generally provides an additional layer of protection to fibers 18 within cable 10, and may provide resistance against damage (e.g., damage caused by contact or compression during installation, damage from the elements, damage from rodents, etc.).

In an exemplary embodiment, armor layer 30 is located outside of binder film 28. In various embodiments, armor layer 30 is formed from a corrugated sheet of metal material having an alternating series of ridges and troughs. In one embodiment, the corrugated metal is steel. In other embodiments, other non-metallic strengthening materials may be used. For example, armor layer 30 may be formed from fiberglass yarns (e.g., coated fiberglass yarns, rovings, etc.). In some embodiments, armor layer 30 may be formed from plastic materials having a modulus of elasticity over 2 GPa, and more specifically over 2.7 GPa. Such plastic armor layers may be used to resist animal gnawing and may include animal/pest repellant materials (e.g., a bitter material, a pepper material, synthetic tiger urine, etc.). In one embodiment, cable 10 could include a layer of nylon 12 acting to resist termites.

As shown in FIGS. 1 and 2, armor layer 30 includes a first segment 32 and a second segment 34. First segment 32 has a first lateral edge 36 and a second lateral edge 38, and second segment 34 has first lateral edge 40 and a second lateral edge 42. In the embodiment shown, lateral edges 36, 38, 40 and 42 are substantially parallel to the longitudinal axis of cable 10. In various embodiments discussed herein, lateral edge 36 of first segment 32 is positioned adjacent to lateral edge 40 of second segment 34, and lateral edge 38 of first segment 32 is positioned adjacent to lateral edge 42 of second segment 34 such that combined first segment 32 and second segment 34 form a reinforcement layer that surrounds the plurality of core elements. While the embodiments discussed herein relate primarily to cables including two-piece reinforcement layers, in other embodiments, armor layer 30 can be multi-piece armor layers that include three, four, five or more segments with peripheral edges and overlaps as discussed herein.

In the embodiment of FIGS. 1 and 2, first segment 32 and second segment 34 of armor layer 30 are wrapped around the core elements such that lateral edge 36 of first segment 32 passes over or overlaps lateral edge 40 of second segment 34 creating a first overlap portion 44 and that lateral edge 38 of first segment 32 passes over or overlaps lateral edge 42 of second segment 34 creating a second overlap portion 46. In various embodiments, first segment 32 and second segment 34 are semi-cylindrical or arch-shaped elements with second segment 34 received partially within first segment 32 creating overlap portions 44 and 46. In the embodiment shown in FIG. 2, overlap portion 46 is spaced approximately 180 degrees from overlap portion 44. In other embodiments, overlap portion 46 may be spaced more or less than 180 degrees from overlap portion 44.

In various embodiments, the sections of armor segments 32 and 34 within overlap portions 44 and 46 may be coupled together to help maintain multi-piece armor layer 30 in the wrapped arrangement shown in FIGS. 1 and 2. In one embodiment, a bonding agent or adhesive may be located between opposing surfaces within overlap portions 44 and 46 to bind armor segments 32 and 34 together. In other embodiments, as discussed in more detail below, one or more mechanical coupling arrangements can be used to couple armor segment 32 to armor segment 34.

Cable jacket 12 may include a plurality of embedded elongate members, shown as access features 50 and 52. In general, access features 50 and 52 are elongate members or structures embedded within the material of cable jacket 12. In various embodiments, access features 50 and 52 are contiguous members that extend the length of cable jacket 12 between the first and second ends of the cable.

In general, cable jacket 12 is made from a first material, and access features 50 and 52 are made from a second material that is different from the first material. The difference in materials provides a discontinuity or weakness within cable jacket 12 at the location of access features 50 and 52. These discontinuities provide an access point that allows a user of cable 10 to split cable jacket 12 when access to optical fibers 18 is desired. In various embodiments, access features 50 and 52 may be formed from a material (e.g., a polypropylene/polyethylene blend) with low bonding relative to the material of cable jacket 12 (e.g., a medium density polyethylene) that allows for jacket splitting by the user. In various embodiments, access features 50 and 52 may be formed (e.g., coextruded) as described in US 2013/0051743, filed Oct. 25, 2012, which is incorporated herein by reference in its entirety. In other embodiments, access features 50 and 52 are non-extruded elements, such as rip cords, that are embedded in the material of cable jacket 12.

Figure 3:
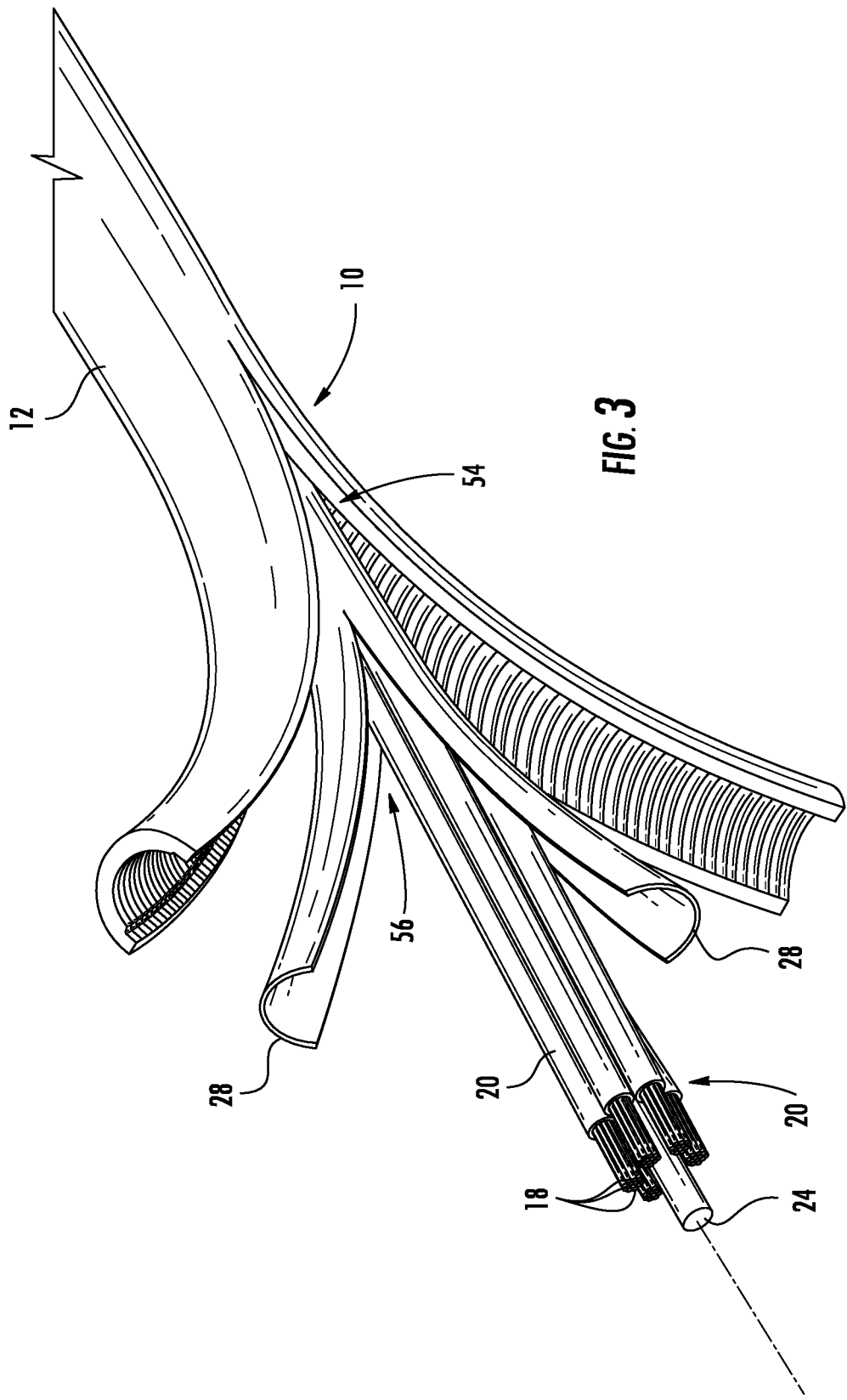
FIG. 3 is a perspective view of the cable of FIG. 1 following opening according to an exemplary embodiment.

As shown in FIG. 2, access features 50 and 52 are positioned within cable jacket to be aligned with and radially exterior to overlap sections 44 and 46, respectively. As shown in FIG. 3, when cable jacket 12 is opened, splits 54 and 56 are formed along the length of cable jacket 12 generally at the position of access features 50 and 52, respectively. With access features aligned with overlap sections 44 and 46, when cable jacket 12 is opened, armor layer 30 is also opened by separating armor segment 32 from armor section 34 at the same time or with the same opening action that opens cable jacket 12. Thus, in such embodiments, when cable jacket 12 is opened, armor layer 30 is also opened providing access to the elements of core 26.

In some embodiments, a bonding agent (e.g., Maleic anhydride, ethylene acrylic acid copolymer, etc.) may be used in or adjoining cable jacket 12 to increase bonding between the inner surface of cable jacket 12 and the outer surface of armor layer 30. The bonding between cable jacket 12 and armor layer 30 may facilitate opening of both layers together with a single opening action. Specifically, as cable jacket 12 is opened, armor layer 30 may remain bound to cable jacket 12 causing armor segment 32 to separate from armor segment 34 along overlap sections 44 and 46. The bonding agent may also act to prevent relative sliding of edges of two-piece armor layer 30, and the bonding agent may also be used to prevent relative sliding of the components of any of the other embodiments disclosed herein.

In one embodiment, the outer surfaces of armor layer 30 may include a material or coating (e.g., a thermoplastic exterior coating) that, when heated, bonds to the thermoplastic of cable jacket 12. In one such embodiment, the exterior coating of armor layer 30 is melted by the heat of the material of cable jacket 12 as the jacket is extruded over armor layer 30 and the subsequent cooling bonds together the materials of cable jacket 12 and the exterior coating of armor layer 30. In another embodiment, an induction heater is used to heat armor layer 30, causing the exterior coating of armor layer 30 to melt and bond to the inner surface of cable jacket 12. In one embodiment, the exterior coating of armor layer 30 is an ethylene acrylic acid copolymer (EAAC).

As discussed above, cable 10 includes a binder film 28 located between the elements of core 26 and armor layer 30. In some embodiments, the outer surface of binder film 28 is bonded to the inner surface of armor layer 30 (e.g., with glue, bonding agent, etc.) so that when cable jacket 12 is opened utilizing access features 50 and 52, binder film 28 remains bound to armor layer 30 and armor layer 30 remains bound to cable jacket 12. Thus, a single opening action splitting cable jacket 12 along access features 50 and 52 acts to open armor layer 30 and binder film 28. In one embodiment, an induction heater is used to heat armor layer 30 causing the material of film 28 to melt and bond to the inner surface of armor layer 30. In one such embodiment, air may be injected into the center of film 28, pushing film 28 outward to engage the inner surface of armor layer 30 during heating to increase bonding between film 28 and armor layer 30.

Figure 4:
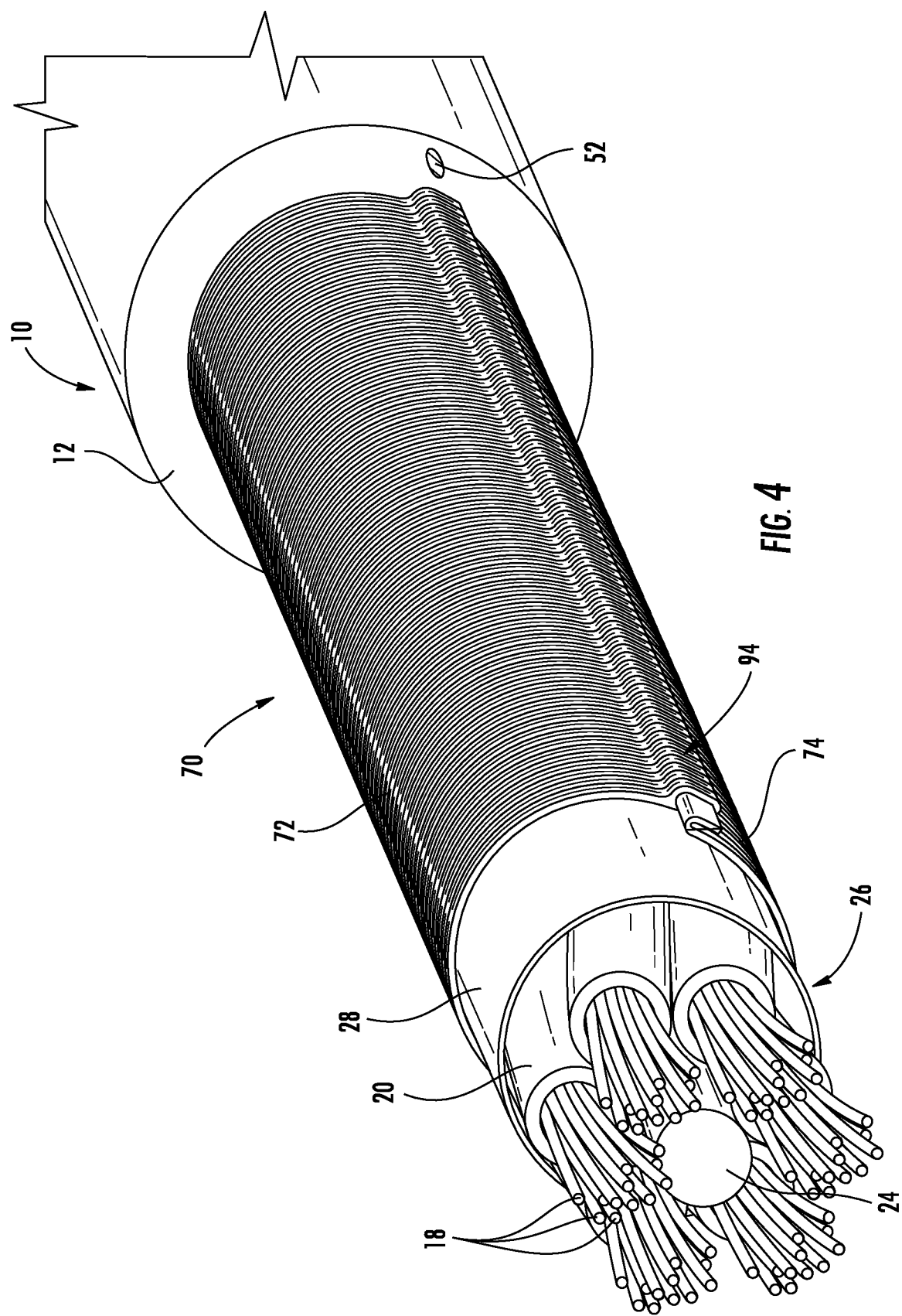
FIG. 4 is a perspective view of an optical fiber cable according to another exemplary embodiment.
Figure 5:
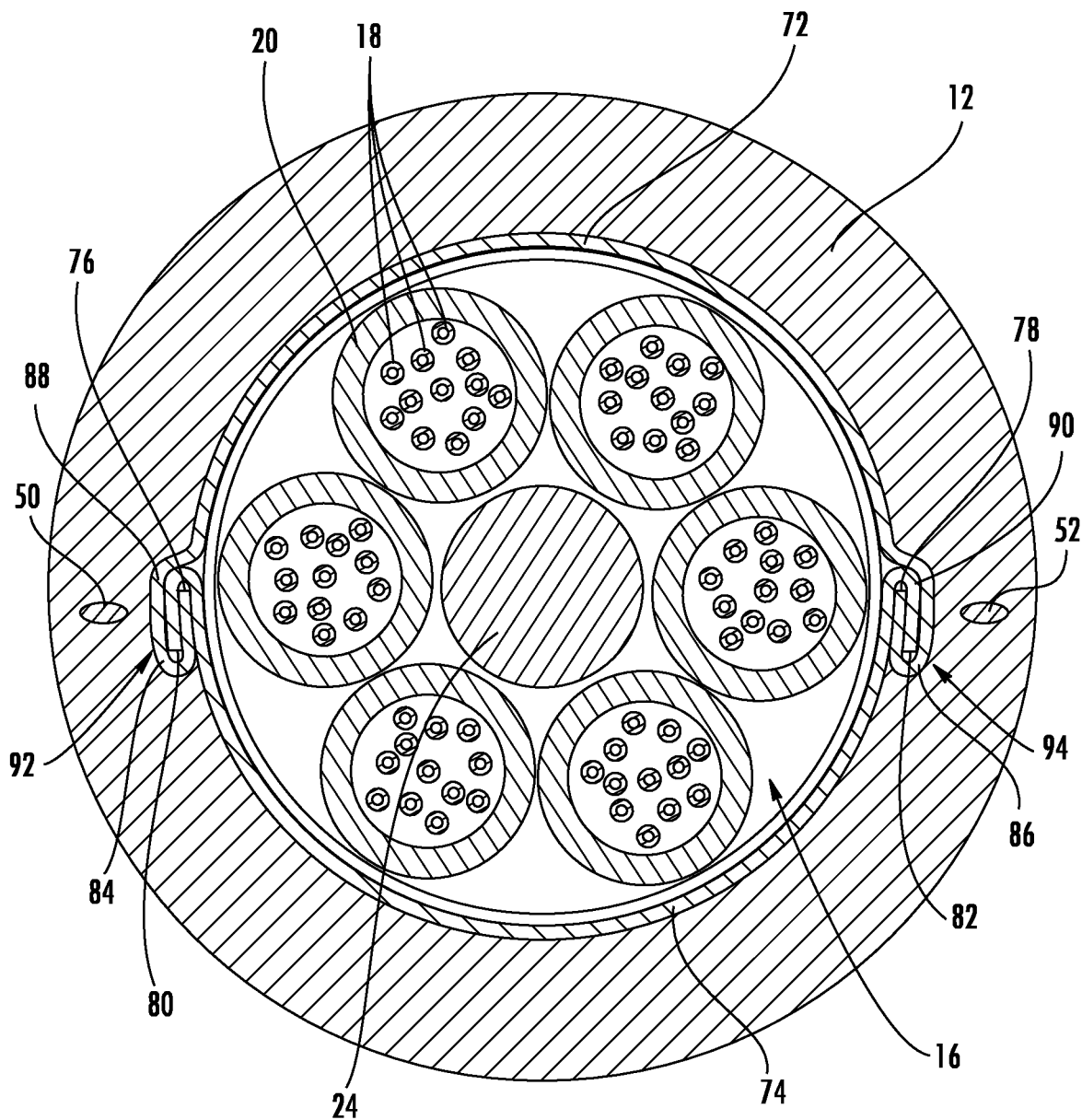
FIG. 5 is a cross-sectional view of the cable of FIG. 4 according to an exemplary embodiment.
Figure 6:
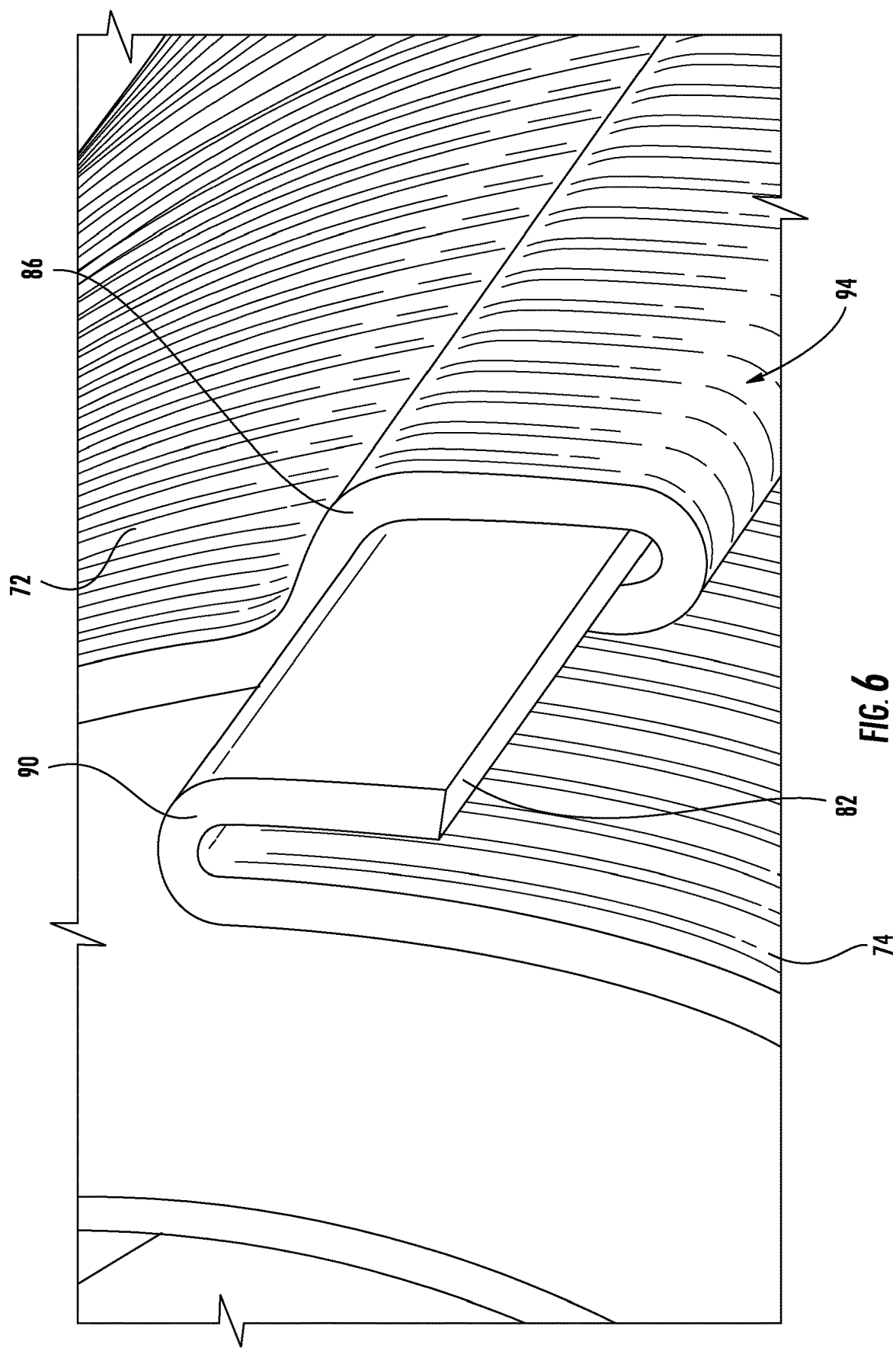
FIG. 6 is a detailed perspective view showing an interlocked portion of the cable of FIG. 4 according to an exemplary embodiment.

As noted above, in various embodiments, the multi-piece reinforcement layers discussed herein may include one or more mechanical coupling structures instead of or in conjunction with adhesive based couplings. Referring to FIGS. 4-6, cable 10 is shown including a reinforcement layer, shown as armor layer 70, including a mechanical coupling structure. Armor layer 70 is substantially the same as armor layer 30 discussed above except as discussed herein.

Armor layer 70 includes a first segment 72 and a second segment 74. First segment 72 has a first lateral edge 76 and a second lateral edge 78, and second segment 74 has a first lateral edge 80 and a second lateral edge 82. In the embodiment shown, lateral edges 76, 78, 80 and 82 are substantially parallel to the longitudinal axis of cable 10. As shown in FIG. 5, first armor segment 72 includes a first curved or hook shaped portion 84 extending from and adjacent to first lateral edge 76 and a second curved or hook shaped portion 86 extending from and adjacent to second lateral edge 78. Second armor segment 74 includes a first curved or hook shaped portion 88 extending from and adjacent to first lateral edge 80 and a second curved or hook shaped portion 90 extending from and adjacent to second lateral edge 82. In general, the curved portions of first segment 72 and second segment 74 are curved and bent portions of the material armor layer 70 adjacent to the respective lateral edges.

As shown in FIGS. 5 and 6, hook portion 84 of first armor segment 72 is interlocked with and received within hook portion 88 of second armor segment 74, and hook portion 86 of first armor segment 72 is interlocked with and received within hook portion 90 of second armor segment 74. Thus, in this embodiment, armor layer 70 includes a first overlap section 92 formed by the interlocked hook portions 84 and 88 and a second overlap section 94 formed by the interlocked hook portions 86 and 90. The engagement between the hook portions of first armor segment 72 and second armor segment 74 act to couple together the segments of armor layer 70 while still allowing for separation of the segments upon opening of cable jacket 12. In addition, the interlocked hook portions of armor layer 70 may also provide circumferential rigidity by limiting relative radial movement between armor segments 72 and 74. Further, the localized larger armor thickness at overlap sections 92 and 94 may add axial strength to cable 10.

Figure 7:
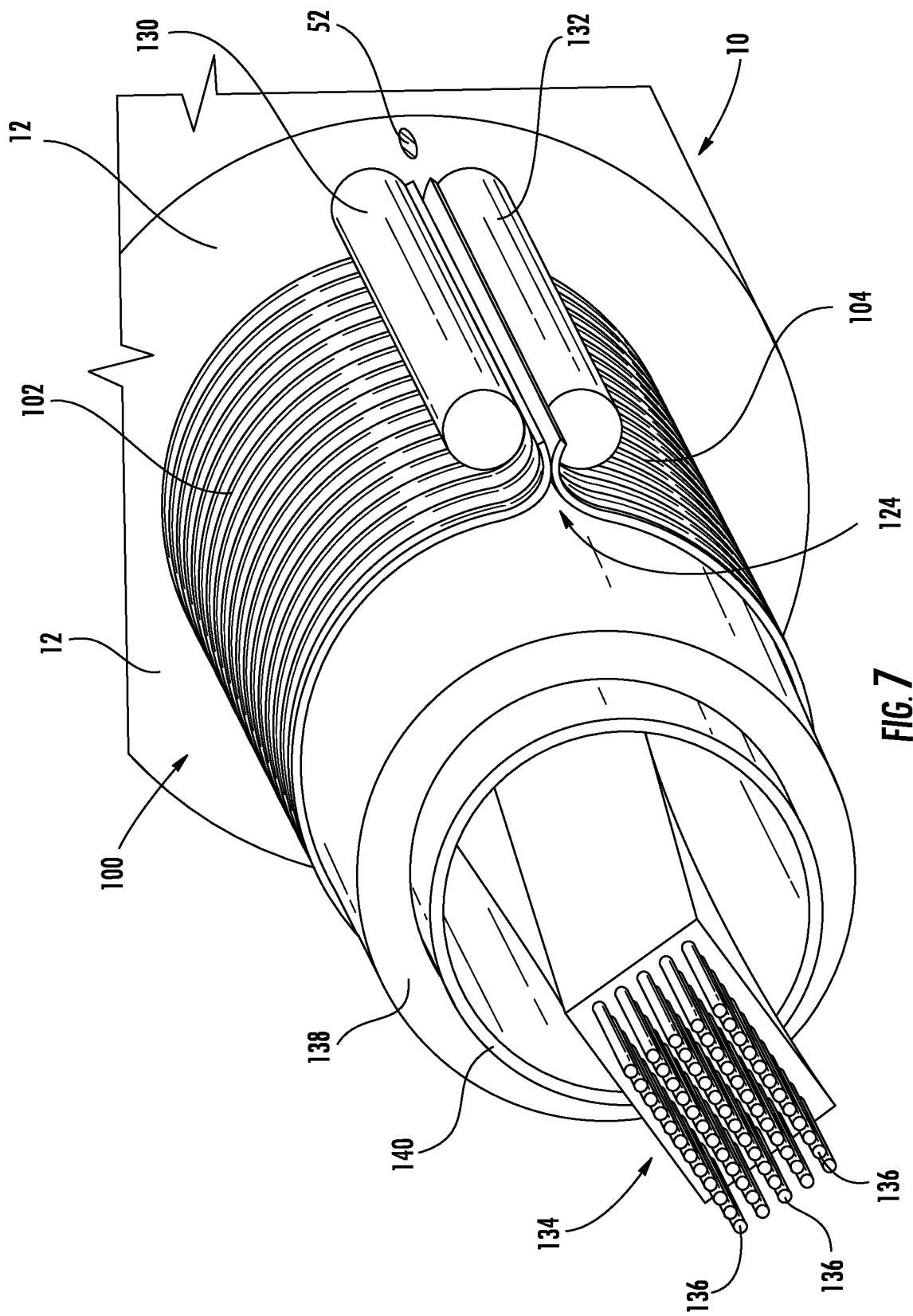
FIG. 7 is a perspective view of an optical fiber cable according to another exemplary embodiment.
Figure 8:
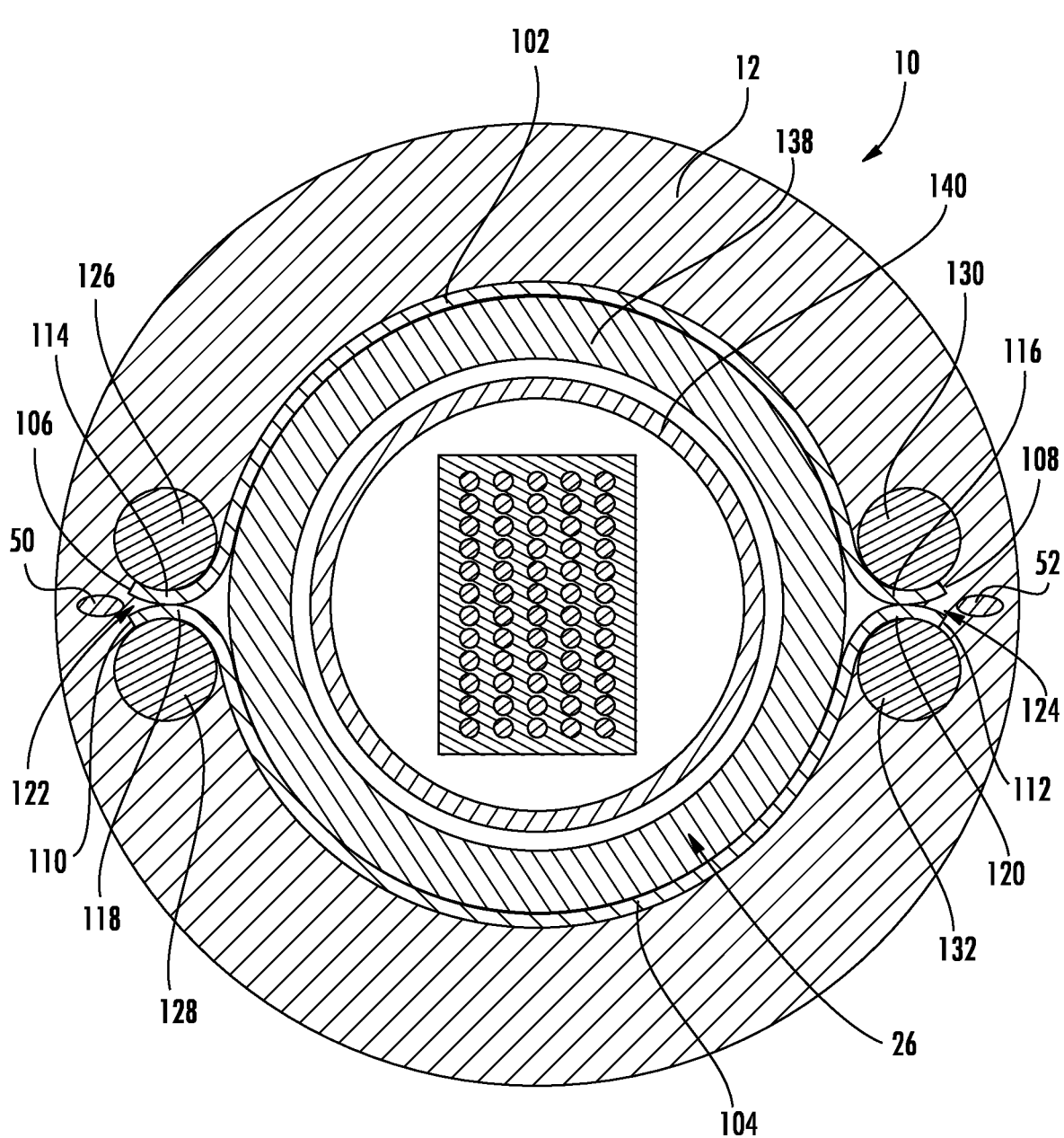
FIG. 8 is a cross-sectional view of the cable of FIG. 7 according to an exemplary embodiment.

Referring to FIGS. 7 and 8, cable 10 is shown including a reinforcement layer, shown as armor layer 100, including a mechanical coupling structure, according to another exemplary embodiment. Armor layer 100 is substantially the same as armor layer 30, except as discussed herein.

Armor layer 100 includes a first segment 102 and a second segment 104. First segment 102 has a first lateral edge 106 and a second lateral edge 108, and second segment 104 has first lateral edge 110 and a second lateral edge 112. In the embodiment shown, lateral edges 106, 108, 110 and 112 extend substantially parallel to the longitudinal axis of cable 10. As shown in FIG. 8, first armor segment 102 includes a radially extending portion 114 extending from and adjacent to first lateral edge 106 and a second radially extending portion 116 extending from and adjacent to second lateral edge 108. Second armor segment 104 includes a first radially extending portion 118 extending from and adjacent to first lateral edge 110 and a second radially extending portion 120 extending from and adjacent to second lateral edge 112.

As shown in FIG. 8, radial portion 114 of first armor segment 102 extends radially adjacent to and facing radial portion 118 of second armor segment 104, and radial portion 116 of first armor segment 102 extends radially adjacent to and facing radial portion 120 of second armor segment 104. Thus, in this embodiment, armor layer 100 includes a first overlap section 122 formed by the adjacent radial portions 114 and 118 and includes a second overlap section 124 formed by the adjacent radial portions 116 and 120. In various embodiments, within overlap section 122, an inner surface of radial portion 114 contacts an inner surface of radial portion 118, and within overlap section 124, an inner surface of radial portion 116 contacts an inner surface of radial portion 120. In this manner, armor layer 100 completely surrounds core 26 of cable 10.

As shown in FIGS. 7 and 8, in various embodiments, cable 10 includes a plurality of elongate strength members embedded within the material of cable jacket 12. In the embodiment shown, cable 10 includes a first pair of elongate strength members 126 and 128 and a second pair of elongate strength members 130 and 132. In such embodiments, overlap section 122 is located between elongate strength members 126 and 128, and overlap section 124 is located between elongate strength members 130 and 132. In various embodiments, the outer surfaces of elongate strength members 126 and 128 may contact or engage the outer surfaces of radial portion 114 and radial portion 118, respectively, and the outer surfaces of elongate strength members 130 and 132 may contact or engage the outer surfaces of radial portion 116 and radial portion 120, respectively. In such embodiments, the elongate strength members may act to maintain the relative position of first armor segment 102 and second armor segment 104. In addition, the elongate strength members may also act to couple together first armor segment 102 and second armor segment 104 by maintaining the engagement between the inner surfaces of radial portions 114 and 118 and radial portions 116 and 120.

In various embodiments, elongate strength members 126, 128, 130 and 132 may be a variety of strength members utilized in fiber optic cable construction. In one embodiment, elongate strength members 126, 128, 130 and 132 may be glass-reinforced plastic rods. In other various embodiments, elongate strength members 126, 128, 130 and 130 may be steel rods, aramid yarn strands or any other suitable strength member. As noted above, cable 10 may be configured with a wide variety of optical transmission elements. For example as shown in FIG. 7, core 26 of cable 10 may include a stack 134 of a plurality of optical communication elements, shown as fiber optic ribbons 136, located within the channel of cable jacket 12. In the embodiment shown in FIG. 7, cable 10 is a single-tube cable construction that includes a single buffer tube 138 and a water blocking layer, shown as water blocking tape 140, that surround fiber optic ribbons 136. In various embodiments, the water blocking layer may be a water blocking foam, gel, woven or nonwoven material.

Figure 9:
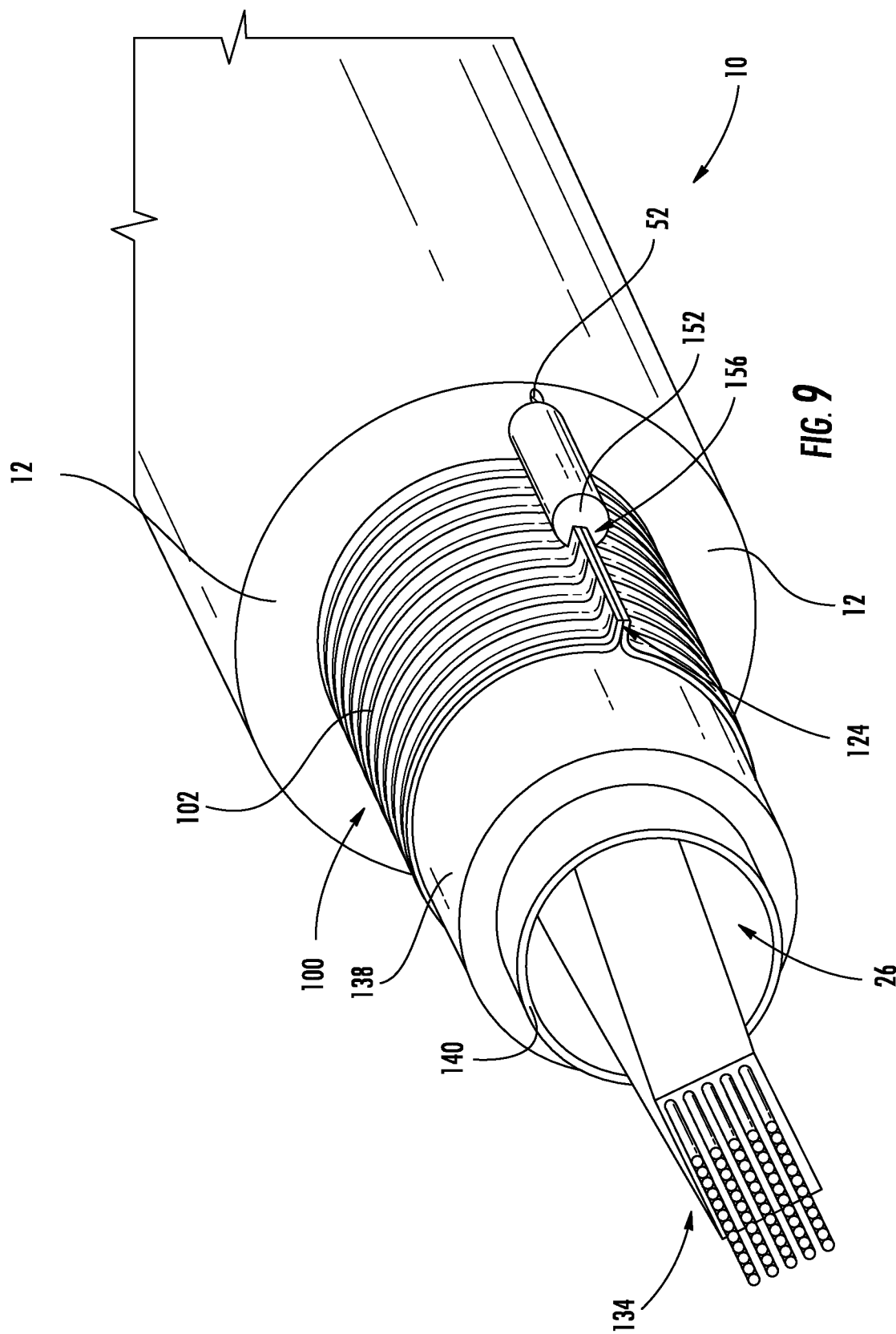
FIG. 9 is a perspective view of an optical fiber cable according to another exemplary embodiment.
Figure 10:
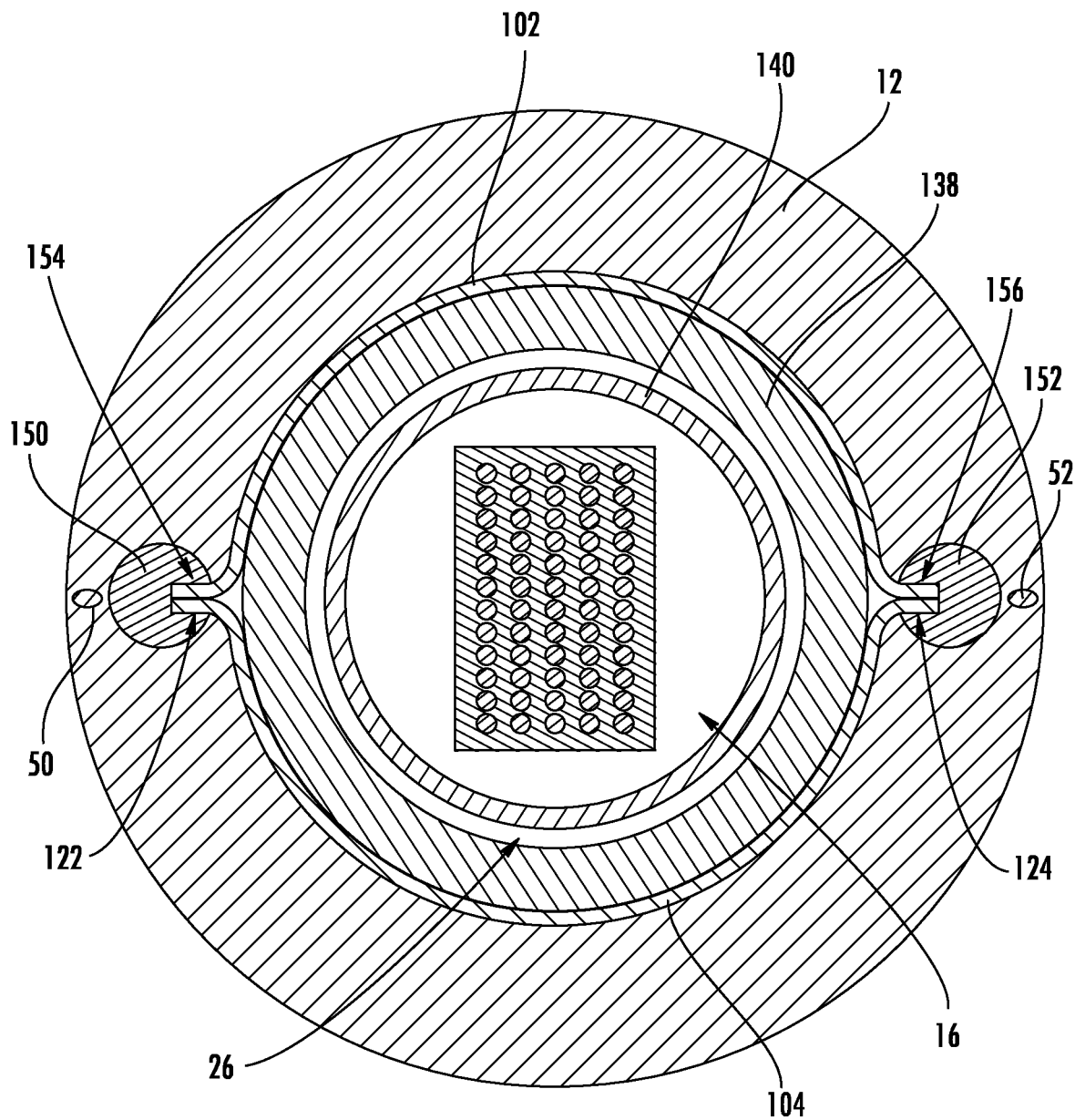
FIG. 10 is a cross-sectional view of the cable of FIG. 9 according to an exemplary embodiment.

Referring to FIGS. 9 and 10, cable 10 is shown including armor layer 100 engaged with elongate strength members according to another exemplary embodiment. The embodiment shown in FIGS. 9 and 10 is substantially similar to the embodiment of FIGS. 7 and 8 except as discussed herein. As shown in the embodiment of FIGS. 9 and 10, cable 10 may include a first elongate strength member 150 and a second elongate strength member 152 embedded within the material of cable jacket 12. First elongate strength member 150 includes an axially aligned channel or slot 154, and second elongate strength member 152 includes an axially aligned channel or slot 156. In this embodiment, overlap portion 122 of armor layer 100 is received within slot 154, and overlap portion 124 of armor layer 100 is received within slot 156. In some embodiments, the surfaces that define slot 154 engage the outer surfaces of overlap portion 122 and the surfaces that define slot 156 engage the outer surfaces of overlap portion 124. Through this engagement, first elongate strength member 150 and second elongate strength member 152 act to couple first armor segment 102 and second armor segment 104 together to form armor layer 100, which surrounds the core of cable 10.

Figure 11:
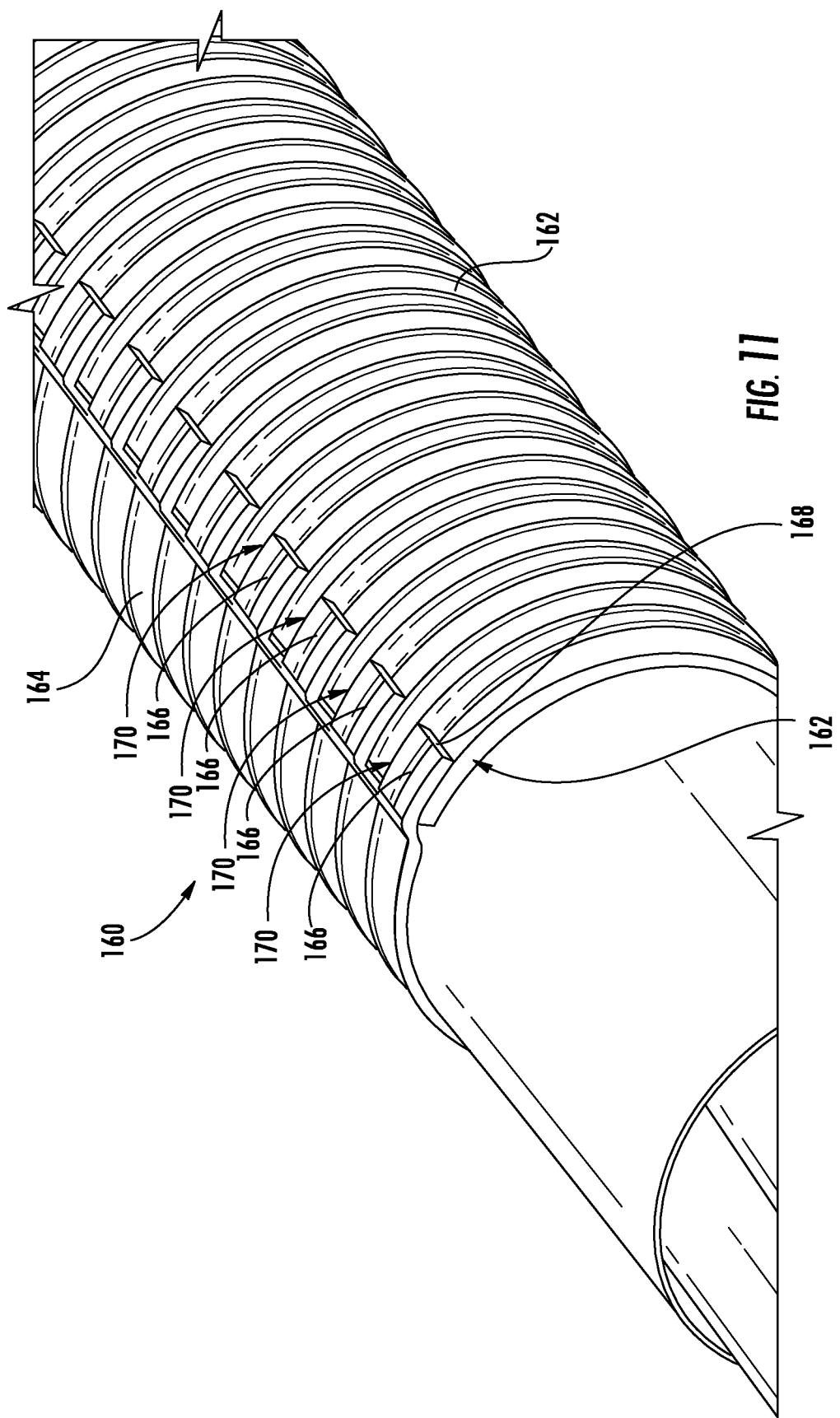
FIG. 11 is a perspective view of an optical fiber cable according to another exemplary embodiment.

Referring to FIG. 11, a coupling arrangement for a multi-piece reinforcement layer is shown according to an exemplary embodiment. Specifically, FIG. 11 shows an overlap portion 160 of a reinforcement layer. In this embodiment, the reinforcement layer includes a first armor segment 162 and a second armor segment 164. Second armor segment 164 includes a plurality of tabs 166 located adjacent to lateral edge 168. Tabs 166 are formed by a series of circumferentially extending slits 170 extending circumferentially from lateral edge 168. In the embodiment shown, a section of first armor segment 162 adjacent the lateral edge is received between tabs 166 such that tabs 166 provide a friction fit to couple first armor segment 162 to second armor segment 164. In such embodiments, some of tabs 166 extend above first armor segment 162 such that the inner surface of the tabs engage the outer surface of first armor segment 162, and other tabs 166 extend below first armor segment 162 such that the outer surface of the tabs engages the inner surface of first armor segment 162. In various embodiments, it is this engagement between tabs 166 and the adjacent armor section that acts to couple the segments of the armor layer together. In various embodiments, the orientation of tabs 166 alternate such that one tab 166 extends above armor segment 162, the next tab 166 extends below armor segment 162 and so on. It should be understood that one or more of the overlap portions of the multi-piece reinforcement layers discussed herein may be formed as overlap section 160.

Figure 12:
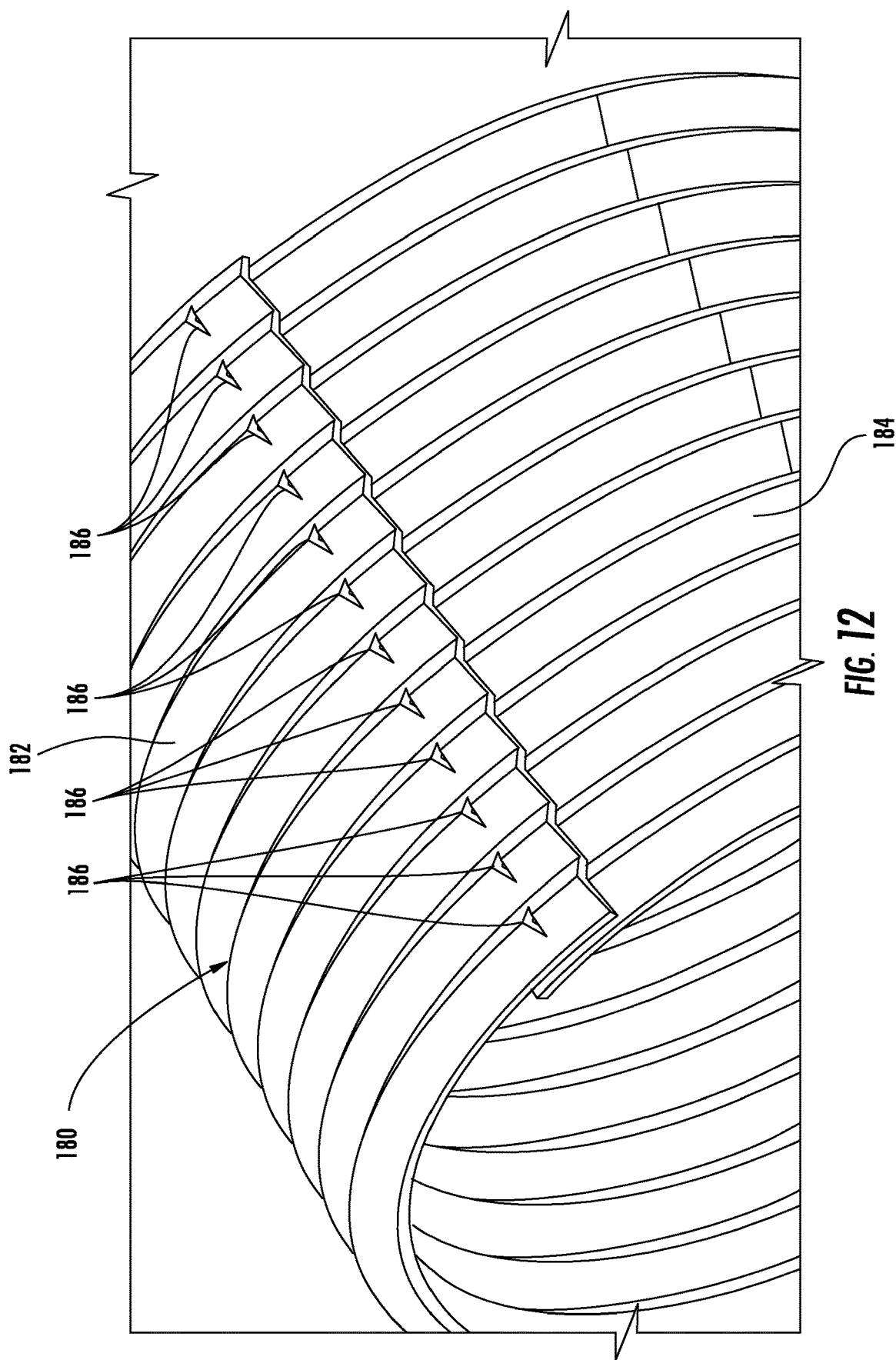
FIG. 12 is a perspective view of a reinforcement layer overlap section of an optical fiber cable according to an exemplary embodiment.

Referring to FIG. 12, a coupling arrangement for a multi-piece reinforcement layer is shown according to an exemplary embodiment. Specifically, FIG. 12 shows an overlap portion 180 of a reinforcement layer. In this embodiment, the reinforcement layer includes a first armor segment 182 and a second armor segment 184. In this embodiment, overlap portion 180 includes a plurality of perforations 186. In various embodiments, perforations 186 extend through both armor segment 182 and armor segment 184 within overlap portion 180. In another embodiment, perforations 186 only extend through the upper armor segment within the overlap section. In various embodiments, perforations 186 tend to include distortions and/or projecting pieces of material at the edges of perforations 186, and these distortions and projections tend to engage the material of the adjacent armor segment creating a friction fit that tends to hold together overlap portion 180. It should be understood that one or more of the overlap portions of the multi-piece reinforcement layers discussed herein may be formed as overlap section 180.

Figure 13:
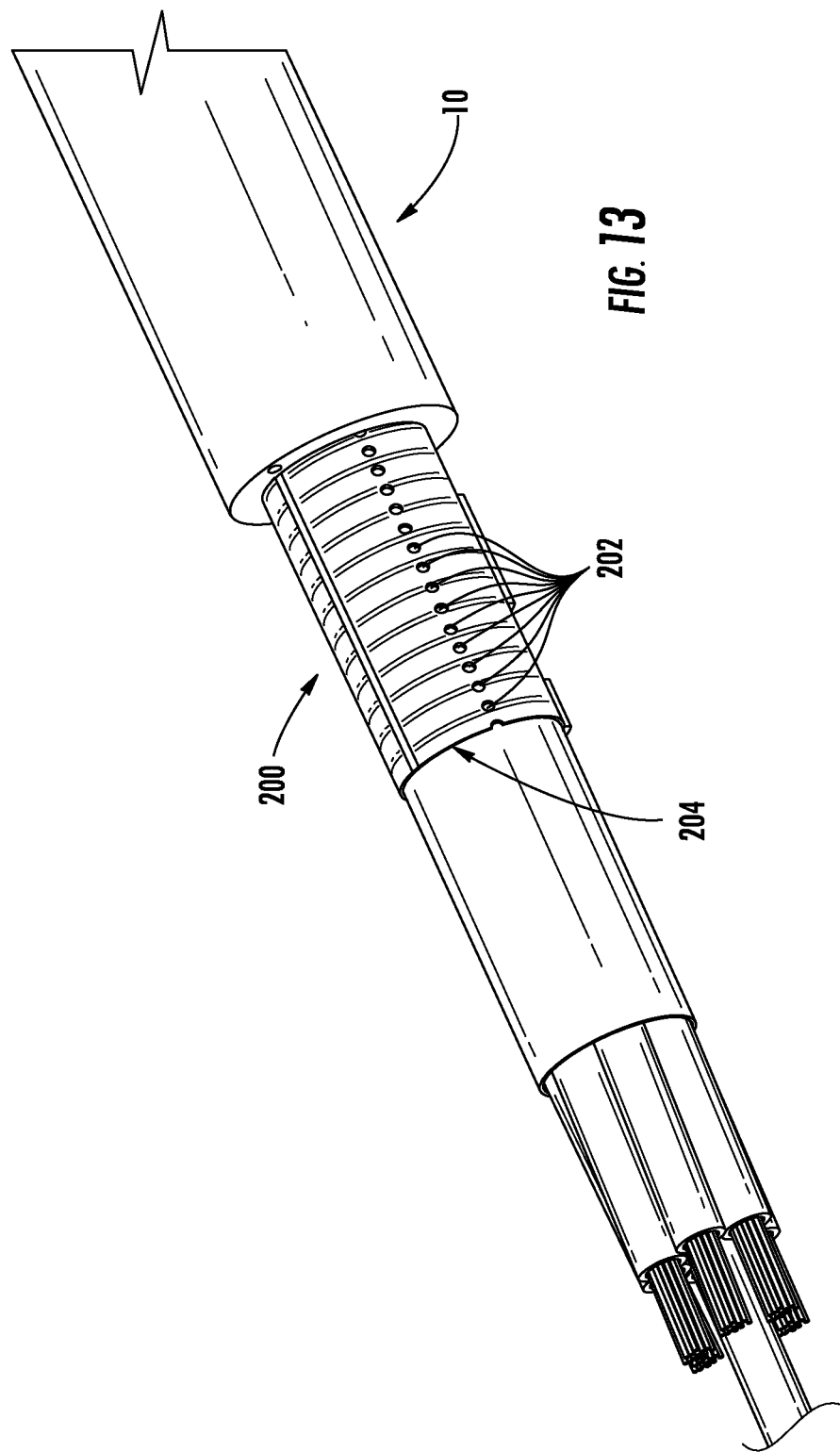
FIG. 13 is a perspective view of a reinforcement layer overlap section of an optical fiber cable according to an exemplary embodiment.

Referring to FIG. 13, a reinforcement layer, shown as armor layer 200, is shown according to an exemplary embodiment. Armor layer 200 is a multi-piece armor layer and can incorporate any of the coupling features discussed above. In the embodiment shown, armor layer 200 includes a series of perforations 202 extending axially along armor layer 200 adjacent to overlap section 204 of armor layer 200. Perforations 202 extend through armor layer 200 and function as a tear-line or frangible line to facilitate opening of armor layer 200. In such embodiments, upon the opening of cable jacket 12 utilizing access features 50 and 52, perforations 202 allow armor layer 200 to be torn open along with cable jacket 12. In various embodiments that include a multi-piece armor layer, the coupling between the armor layer segments at the overlap sections may be strong enough that the coupling at the overlap will not easily decouple upon opening of cable jacket 12. In such embodiments, perforations 202 may be formed adjacent to the overlap section allowing the armor layer to be torn open without the decoupling of the overlap section. In another embodiment, perforations 202 may be located 180 degrees from one or more of the armor overlap sections discussed herein. It should be understood that perforations 202 may be utilized in conjunction with any of the reinforcement layer embodiments discussed herein.

Figure 14:
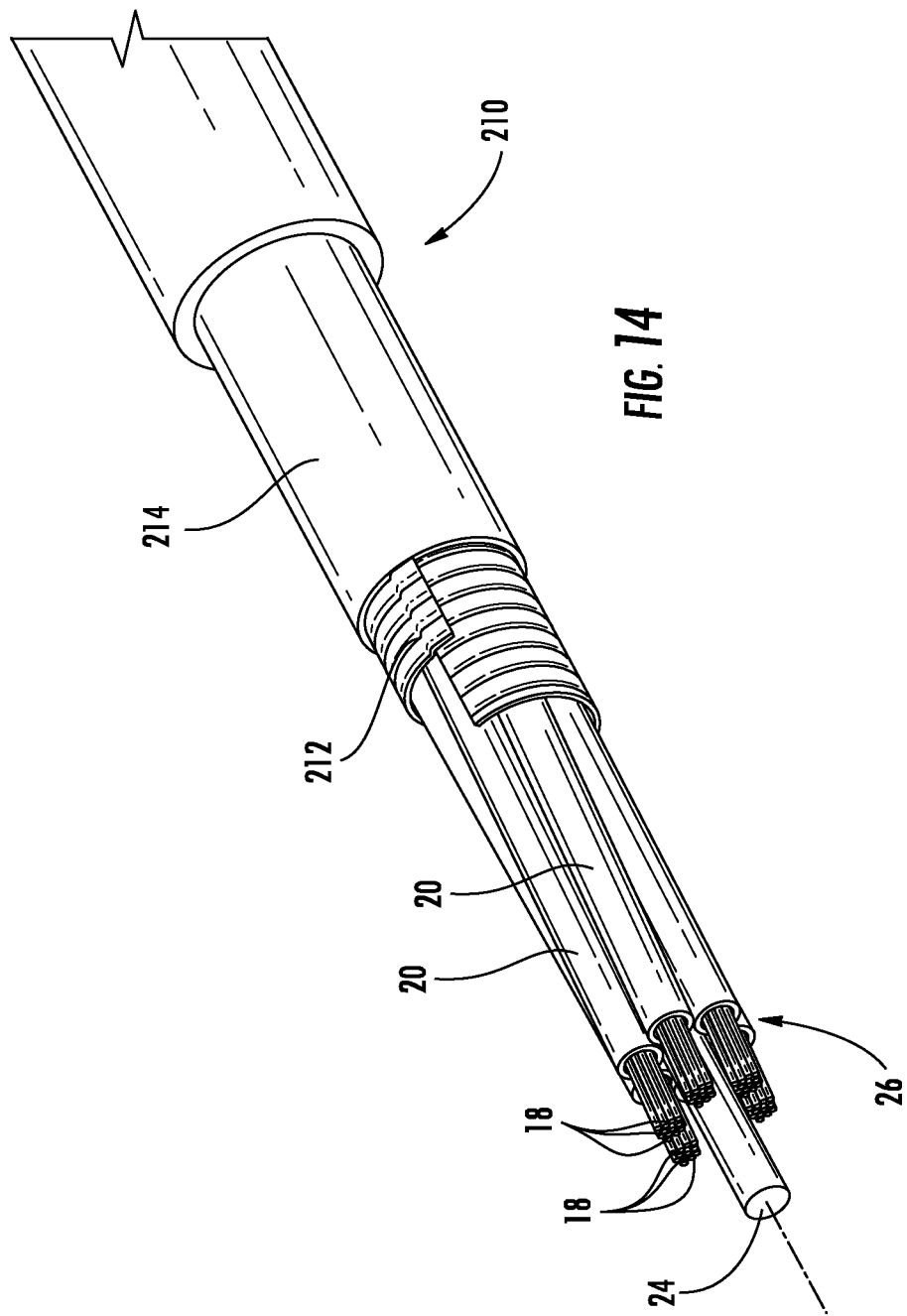
FIG. 14 is a perspective view of an optical fiber cable according to an exemplary embodiment.

Referring to FIG. 14, an optical communication cable, shown as cable 210, is shown according to an exemplary embodiment. Cable 210 is substantially similar to cable 10 discussed above, except as discussed herein. Cable 210 includes an armor layer 212 and binder film 214. As shown, in this embodiment, armor layer 212 is located between core 26 and binder film 214, and binder film 214 is located between armor layer 212 and cable jacket 12.

In various embodiments, the elements of core 26 are wrapped around central strength member 24 in a pattern that may include one or more spiral sections. In various embodiments, the elements of core 26 are wrapped around central strength member 24 in an S-Z stranding pattern that includes a plurality of left-handed spirally wrapped sections, a plurality of right-handed spirally wrapped sections and a plurality of reversal sections providing the transition between each right-handed and left-handed spirally wrapped sections. In various embodiments, armor layer 212 is sized to impart a radial inwardly directed force onto the outer surfaces of the elements of core 26. The radial inwardly directed force imparted by armor layer 212 increases the normal force between the elements of core 26 and central strength element 24, which acts to limit or prevent relative movement between the core elements and the central strength element as the elements are advanced through the cable assembly process. In some such embodiments, armor layer 212 may be wrapped or coupled around core 26 a short distance after core 26 is wrapped in the desired pattern around central strength member 24, for example, by an oscillating nose piece used in fiber optic cable construction.

Specifically, the inwardly directed force provided by armor layer 212 assists to hold buffer tubes 20 (and other core elements such as filler rods 22 shown in FIG. 1) in a fixed position relative to central strength member 24 by increasing the normal force and therefore frictional force between these components. Thus, in some embodiments, an interference fit is provided between the outer surfaces of the core elements and armor layer 212 such that armor layer 212 acts to provide an inwardly directed force onto the core elements of cable 10. In addition, the inwardly directed force provided by armor layer 212 acts to prevent/resist unraveling of the wound core elements. Thus, in various embodiments, in addition to providing structural support, armor layer 212 is a constraining element or constraining sleeve that acts to bind together the core of cable 10. In some such embodiments, the closing point of the armor along the manufacturing line, where the armor first contacts and fully surrounds the core, is within a short distance from the closing point of the stranded elements of the core, where the stranded elements first come together along the manufacturing line in the pattern of stranding, such as around a central strength member, at the end of the stranding machine. The short distance may be less than ten lay lengths of the strand profile (e.g., less than 5 lay lengths, less than one lay length), where the lay length is the average lengthwise distance that the strand pattern has per full helical rotation. For helically stranded elements, this would be the lengthwise distance per helix, and for SZ stranded (or other reverse-oscillatory stranded profiles), this would be an average along a set length for a repeating profile. And/or, the short distance may be less than 5 meters on the manufacturing line, such as less than 1 meter, or even a half meter in some embodiments.

In various embodiments, armor layer 212 contacts the outer surfaces of buffer tubes 20 and any other core element such that the radial inwardly directed force is applied as discussed herein. In various embodiments, armor layer 212 is in direct contact with the outer surfaces of buffer tubes 20, and in some such embodiments there is no helically wrapped binder located between armor layer 212 and the elements of core 26. In various embodiments, a layer of powder, such as water absorbing powder or particles, such as super absorbent polymer (SAP), or a water swellable gel or liquid, is located within bore 16. In such embodiments, the inner surface of armor layer 212 may be coupled to water absorbent particles or other material that directly contacts the outer surfaces of buffer tubes 20 under the radial inwardly directed force applied by armor layer 212. In other words, as discussed herein, contact between armor layer 212 and buffer tubes 20 and filler rods 22 may include contact through certain discontinuous intermediate or filler materials that may be present within bore 16, such as SAP particles, SAP yarns and/or water swellable gels and liquids, that may be positioned within bore 16. However, as discussed herein, contact between armor layer 212 and buffer tubes 20 and filler rods 22 does not include contact through a circumferentially continuous layer of material located armor layer 212 and buffer tubes 20.

Similar to some of the embodiments discussed above, access features, such as access features 50 and 52 discussed above, are aligned with overlap portions of armor layer 212. In the embodiment of FIG. 14, the outer surface of armor layer 212 is bonded to the inner surface of binder film 214, and the outer surface of binder film 214 is bonded to the inner surface of cable jacket 12. Thus, in this embodiment, when cable jacket 12 is opened, utilizing features 50 and 52, armor layer 212 remains bound to binder film 214 and binder film 214 remains bound to cable jacket 12. Thus, a single opening action splitting cable jacket 12 along access features 50 and 52 acts to open armor layer 212 and binder film 214 allowing access to the elements of core 26.

In various embodiments, the optical transmission elements of core 26 can include a wide variety of optical fibers including multi-mode fibers, single mode fibers, bend insensitive fibers, etc. In various embodiments, the optical transmission elements of core 26 are micromodules of densely packed fibers with zero excess fiber length within a buffer tube. In other embodiments, the optical transmission elements of core 26 are buffer tubes of a loose tube cable. In another embodiment, the optical transmission elements of core 26 are tight buffered optical fibers. In another embodiment, the optical transmission elements of core 26 are optical fiber ribbons.

Figure 15:
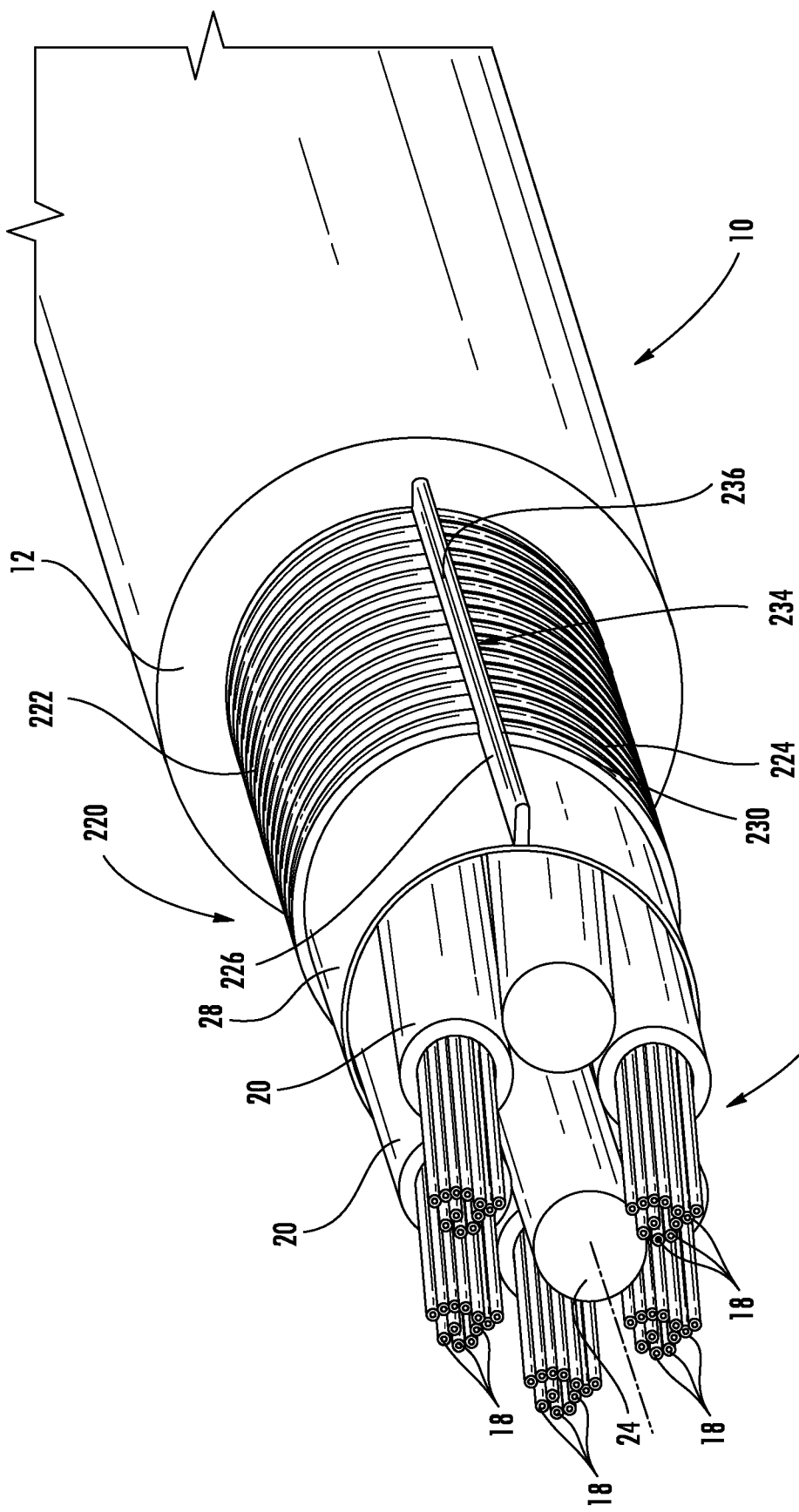
FIG. 15 is a perspective view of an optical fiber cable according to another exemplary embodiment.

Referring to FIG. 15, cable 10 is shown including a reinforcement layer, shown as armor layer 220, according to another exemplary embodiment. Armor layer 220 is substantially the same as armor layer 30, except as discussed herein. Armor layer 220 includes a first segment 222 and a second segment 224. First segment 222 has a first lateral edge 226 and a second lateral edge, and second segment 224 has first lateral edge 230 and a second lateral edge. It should be noted that similar to the cable embodiments discussed above, armor layer 220 includes second lateral edges that mirror first lateral edge 226 of first segment 222 and first lateral edge 230 of second segment 224. In the embodiment shown, the lateral edges of armor segments 222 and 224 extend substantially parallel to the longitudinal axis of cable 10. As shown in FIG. 15, a gap 234 on both sides of the cable separates the adjacent lateral edges of armor segments 222 and 224. In one embodiment, the two gaps 234 are spaced 180 degrees from one another. In one such embodiment, binder film 28 includes radially extending segments, shown as portion 236. Portion 236 extends radially outward and axially within gaps 234 between adjacent lateral edges of armor segments 222. In another embodiment, the adjacent lateral edges of armor segments 222 and 224 abut each other such that no gap 234 is positioned therebetween. In various embodiments, armor layer 220 may provide increased hoop strength and simple assembly due to the lack of coupling structure between armor segments. In addition, because armor layer 220 does not include overlapping sections, the thickness of jacket 12 covering armor layer 220 may be thinner than jackets covering an armor layer including an overlap.

In various embodiments, cable jacket 12 may be a variety of materials used in cable manufacturing, such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc. In various embodiments, buffer tubes 20 are formed from one or more polymer material including polypropylene (PP), polybutylene terephthalate (PBT), polycarbonate (PC), polyamide (PA), polyoxymethylene (POM), poly(ethene-co-tetrafluoroethene) (ETFE), etc.

In various embodiments, the cable embodiments discussed herein may include one or more electrical conductive elements located within bore 16. In various embodiments, the conductive element may be a copper conductive element having a diameter of 12 AWG, 14 AWG, 16 AWG, 18 AWG, 20 AWG, 22 AWG, 24 AWG or smaller.

While the specific cable embodiments discussed herein and shown in the figures relate primarily to cables and core elements that have a substantially circular cross-sectional shape defining substantially cylindrical internal bores, in other embodiments, the cables and core elements discussed herein may have any number of cross-section shapes. For example, in various embodiments, cable jacket 12 and/or buffer tubes 20 may have an oval, elliptical, square, rectangular, triangular or other cross-sectional shape. In such embodiments, the passage or lumen of the cable or buffer tube may be the same shape or different shape than the shape of cable jacket 12 or buffer tube. In some embodiments, cable jacket 12 and/or buffer tube may define more than one channel or passage. In such embodiments, the multiple channels may be of the same size and shape as each other or may each have different sizes or shapes.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. For example, armor serving as a binder, such as to constrain stranded buffer tubes and hold reversals in the stranding profile to a central strength member, is a rolled single sheet or helically wrapped armor tape in some contemplated embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   a cable jacket;
   a plurality of core elements disposed within the cable jacket;
   an armor layer surrounding the plurality of core elements within the cable jacket, wherein the armor layer is a multi-piece layer comprising:
   a first armor segment extending a first portion of a distance around the plurality of core elements;

a second armor segment extending a second portion of the distance around the plurality of core elements, such that in combination the first armor segment and the second armor segment completely surround the plurality of core elements.

2. The optical fiber cable of claim 1, the first armor segment comprising:
   a first overlap portion; and
   a second overlap portion;
the second armor segment comprising:
   a third overlap portion; and
   a fourth overlap portion, wherein the first overlap portion overlaps the third overlap portion to form a first overlap region of the armor layer and the second overlap portion overlaps the fourth overlap portion to form a second overlap region of the armor layer.

3. The optical fiber cable of claim 2, wherein the first overlap portion and the third overlap portion are in contact with one another, and wherein further the second overlap portion and the fourth overlap portion are in contact with one another.

4. The optical fiber cable of claim 2, wherein the first armor segment comprises a perforation in the first overlap portion, wherein the perforation engages with material of the second armor segment in the third overlap portion.

5. The optical fiber cable of claim 4, the perforation being a first perforation, the second armor segment comprising a second perforation in the third overlap portion, wherein the second perforation engages with material of the first armor segment in the first overlap portion.

6. The optical fiber cable of claim 2, wherein at least one of the first armor segment or the second armor segment comprises a plurality of perforations, the plurality of perforations aligned in a direction substantially parallel to a longitudinal axis of the optical fiber cable and offset from the first overlap region and the second overlap region.

7. The optical fiber cable of claim 1, wherein the first armor segment comprises a first hook section and the second armor segment comprises a second hook section, wherein the first hook section and the second hook section interlock so as to join the first armor segment to the second armor segment.

8. The optical fiber cable of claim 1, wherein the first armor segment comprises a first radial portion that extends outwardly in a radial direction of the optical fiber cable, wherein the second armor segment comprises a second radial portion that extends outwardly in the radial direction of the optical fiber cable such that the first radial portion and the second radial portion form an overlap portion of the first armor segment and the second armor segment.

9. The optical fiber cable of claim 8, further comprising a pair of strength elements embedded in the cable jacket, the first radial portion and the second radial portion extending between the pair of strength elements such that the overlap portion is disposed between the pair of strength elements.

10. The optical fiber cable of claim 8, further comprising a strength element embedded in the cable jacket, the strength element comprising a slot, and wherein the overlap portion formed by the first radial portion and the second radial portion is disposed within the slot.

11. The optical fiber cable of claim 1, the optical fiber cable further comprising:
   a water-blocking element disposed between the plurality of core elements and the armor layer.

12. The optical fiber cable of claim 11, wherein the water-blocking element comprises a water-blocking tape.

13. The optical fiber cable of claim 11, wherein the water-blocking element comprises a binder film that surrounds the plurality of core elements, wherein a water-blocking powder is applied to an interior surface of the binder film.

14. The optical fiber cable of claim 11, wherein the plurality of core elements comprises a plurality of optical fiber ribbons.

15. The optical fiber cable of claim 1, the first armor segment comprising a first edge having a plurality of tabs formed therein, the second armor segment comprising a second edge disposed between the plurality of tabs.

16. The optical fiber cable of claim 15, the plurality of tabs comprising a first tab and a second tab, the second edge comprising a first side and a second side, the first tab positioned adjacent to the first side and the second tab positioned adjacent to the second side.

17. The optical fiber cable of claim 1, the first armor segment comprising a first lateral edge, the second armor segment comprising a second lateral edge, wherein the first lateral edge abuts the second lateral edge.

18. The optical fiber cable of claim 1, wherein the plurality of core elements are S-Z stranded.

19. The optical fiber cable of claim 18, further comprising a binder film disposed around the plurality of core elements and configured to maintain the S-Z stranding of the plurality of core elements.

20. The optical fiber cable of claim 1, further comprising a film disposed around the plurality of core elements and between the plurality of core elements and the armor layer.

* * * * *